(12) United States Patent
Matsui et al.

(10) Patent No.: US 8,779,056 B2
(45) Date of Patent: Jul. 15, 2014

(54) AQUEOUS POLYURETHANE RESIN DISPERSION

(75) Inventors: Yosuke Matsui, Kyoto (JP); Mototaka Inaki, Kyoto (JP)

(73) Assignee: Sanyo Chemical Industries, Ltd., Kyoto-shi (JP)

( * ) Notice: Subject to any disclaimer, the term of this patent is extended or adjusted under 35 U.S.C. 154(b) by 479 days.

(21) Appl. No.: 13/264,539

(22) PCT Filed: Apr. 22, 2009

(86) PCT No.: PCT/JP2009/001829
§ 371 (c)(1),
(2), (4) Date: Oct. 14, 2011

(87) PCT Pub. No.: WO2010/122599
PCT Pub. Date: Oct. 28, 2010

(65) Prior Publication Data
US 2012/0029146 A1     Feb. 2, 2012

(51) Int. Cl.
*C08G 18/08* (2006.01)
*C08G 18/28* (2006.01)

(52) U.S. Cl.
USPC .................. 524/591; 524/589; 524/590

(58) Field of Classification Search
CPC ........... C08G 18/0823; C08G 18/0895; C08G 18/6692; C08G 18/755; C08G 18/758; C08G 18/7671
USPC .......................... 524/589, 590, 591
See application file for complete search history.

(56) References Cited

U.S. PATENT DOCUMENTS

| | | | |
|---|---|---|---|
| 5,906,704 A | 5/1999 | Matsuura et al. | |
| 2002/0071811 A1* | 6/2002 | Bhatt et al. | 424/45 |

FOREIGN PATENT DOCUMENTS

| | | | |
|---|---|---|---|
| JP | 2004-002732 A | 1/2004 | |
| JP | 2004-019016 A | 1/2004 | |
| JP | 2004-059676 A | 2/2004 | |
| JP | 2004-307721 A | 11/2004 | |
| JP | 2005-272833 A | 10/2005 | |
| JP | 2007270362 A | * 10/2007 | |
| JP | 2009-096998 A | 5/2009 | |

OTHER PUBLICATIONS

Machine translation of JP2007270362A (Kon), 2007.*
International Search Report of PCT/JP2009/001829, mailing date Jun. 16, 2009.

* cited by examiner

*Primary Examiner* — Aiqun Li
(74) *Attorney, Agent, or Firm* — Westerman, Hattori, Daniels & Adrian, LLP

(57) ABSTRACT

Provided is an aqueous polyurethane resin dispersion having a good film-forming property, and excellent mechanical properties and water resistance. The present invention is an aqueous polyurethane resin dispersion comprising water and a polyurethane resin (U) and satisfying all of the following conditions (1) to (6): (1) a urethane group content in the polyurethane resin (U) is 0.5 to 5.0 mmol/g, based on weight of the polyurethane resin (U); (2) a terminal amino group content in the polyurethane resin (U) is not more than 0.35 mmol/g, based on the weight of the polyurethane resin (U); (3) a number average molecular weight (Mn) of the polyurethane resin (U) is 10,000 to 1,000,000; (4) a ratio (Mw/Mn) of a weight average molecular weight (Mw) to the number average molecular weight (Mn) of the polyurethane resin (U) is 1.5 to 3.5; (5) a melting temperature of the polyurethane resin (U) is 70 to 280° C.; and (6) a volume average particle diameter (Dv) of the polyurethane resin (U) is 0.01 to 1 μm.

15 Claims, No Drawings

AQUEOUS POLYURETHANE RESIN DISPERSION

TECHNICAL FIELD

The present invention relates to an aqueous polyurethane resin dispersion having an excellent film-forming property and water resistance and to a process for producing the same.

BACKGROUND ART

Aqueous polyurethane resin dispersions are being used as highly functional aqueous dispersions for paints, adhesives, textile processing and treating agents, paper treating agents, inks, and the like, because films obtained by drying the dispersions exhibit excellent performances in mechanical properties, durability, chemical resistance, abrasion resistance, and the like. Thus, in years to come, the polyurethane resin dispersions are expected to become increasingly more important from a viewpoint of environmental conservation, resource saving, safety, and the like. As a process for producing the aqueous polyurethane resin dispersion, there is known a process where a urethane prepolymer having terminal isocyanate groups is dispersed in water and chain extended with diamines and the like (a so-called prepolymer mixing process; refer to PTLs 1 to 3).

This is a process for obtaining a high molecular weight polyurethane resin by chain extending the urethane prepolymer with water and/or polyamine compounds in water, concurrently with dispersion or after dispersion. However, because this chain extension reaction is a heterogeneous reaction, the molecular weight distribution of the polyurethane resin becomes broad after the chain extension reaction and the film-forming property of the aqueous polyurethane resin dispersion obtained becomes worse. Thus, there has been a problem that performances (mechanical properties, durability, chemical resistance, abrasion resistance, and the like) of the resultant film deteriorate.

Furthermore, after the chain extension reaction, the terminals of the polyurethane resin become amino groups and, because of hydrophilicity thereof, there has been a problem that water resistance of the film obtained is lowered.

CITATION LIST

Patent Literature

[PTL 1]: Japanese Patent Laid-Open Publication No. 2004-2732
[PTL 2]: Japanese Patent Laid-Open Publication No. 2004-59676
[PTL 3]: Japanese Patent Laid-Open Publication No. 2004-307721

SUMMARY OF INVENTION

Technical Problem

The object of the present invention is to provide an aqueous polyurethane resin dispersion having a good film-forming property, and excellent mechanical properties and water-resistance.

Solution to Problem

The present inventors conducted diligent research and, as a result, found an aqueous polyurethane resin dispersion which can solve the problems described above. That is, the present invention is an aqueous polyurethane resin dispersion comprising water and a polyurethane resin (U) and satisfying all of the following conditions (1) to (6):
(1) a urethane group content in the polyurethane resin (U) is 0.5 to 5.0 mmol/g, based on weight of the polyurethane resin (U);
(2) a terminal amino group content in the polyurethane resin (U) is not more than 0.35 mmol/g, based on the weight of the polyurethane resin (U);
(3) a number average molecular weight (Mn) of the polyurethane resin (U) is 10,000 to 1,000,000;
(4) a ratio (Mw/Mn) of a weight average molecular weight (Mw) to the number average molecular weight (Mn) of the polyurethane resin (U) is 1.5 to 3.5;
(5) a melting temperature of the polyurethane resin (U) is 70 to 280° C.; and
(6) a volume average particle diameter (Dv) of the polyurethane resin (U) is 0.01 to 1 μm.

Advantageous Effects of Invention

The aqueous polyurethane resin dispersion of the present invention has the following characteristics:
(1) because of its good film-forming property, the dispersion as a result can provide a film having very excellent mechanical properties, durability, chemical resistance, abrasion resistance, and the like;
(2) the dispersion can provide a film having very excellent water resistance;
(3) the dispersion is an aqueous dispersion of a polyurethane resin having a very narrow molecular weight distribution; and
(4) the dispersion has excellent dispersion stability.

DESCRIPTION OF EMBODIMENTS

The aqueous dispersion of the polyurethane resin (U) in the present invention can be produced by dispersing the polyurethane resin (U) in water.

The polyurethane resin (U) is produced by reacting a polyol (a) and a polyisocyanate (b) as essential components and further, if necessary, a compound (c) having a hydrophilic group and an active hydrogen atom, a chain extending agent (d), and a reaction terminating agent (e).

From a viewpoint of dispersibility of (U) in water, it is preferable to use a compound (c) having a hydrophilic group and an active hydrogen atom (c) as one of the components. Therefore, (U) is preferably a polyurethane resin having hydrophilic groups.

The polyol (a) includes high molecular weight polyols (a1) having number average molecular weights (hereinafter abbreviated as Mn's) of 300 or more and low molecular weight polyols (a2) having Mn's of less than 300.

In addition, the Mn of a polyol in the present invention is measured by gel permeation chromatography (GPC) using polyethylene glycols as standards. However, the Mn of a low molecular weight polyol is a value calculated from its chemical formula.

The high molecular weight polyols (a1) having Mn's of 300 or more include polyether polyols (a11), polyester polyols (a12), and the like.

The polyether polyols (a11) include aliphatic polyether polyols and aromatic ring-containing polyether polyols.

The aliphatic polyether polyols include, for example, polyoxyethylene polyols [polyethylene glycols (hereinafter abbreviated as PEG) and the like], polyoxypropylene polyols

[polypropylene glycols and the like], polyoxyethylene/propylene polyols, polytetramethylene ether glycols, and the like.

As commercially available aliphatic polyether polyols, there may be mentioned PTMG 1000 [a polytetramethylene ether glycol having an Mn of 1,000; produced by Mitsubishi Chemical Corporation], PTMG 2000 [a polytetramethylene ether glycol having an Mn of 2,000; produced by Mitsubishi Chemical Corporation], PTMG 3000 [a polytetramethylene ether glycol having an Mn of 3,000; produced by Mitsubishi Chemical Corporation], SANNIX Diol GP-3000 [a polypropylene ether triol having an Mn of 3,000; produced by Sanyo Chemical Ind., Ltd.], and the like.

The aromatic polyether polyols include, for example, polyols having a bisphenol skeleton such as ethylene oxide (hereinafter abbreviated as EO) adducts of bisphenol A [EO (2 mole) adduct of bisphenol A, EO (4 mole) adduct of bisphenol A, EO (6 mole) adduct of bisphenol A, EO (8 mole) adduct of bisphenol A, EO (10 mole) adduct of bisphenol A, EO (20 mole) adduct of bisphenol A, and the like] and propylene oxide (hereinafter abbreviated as PO) adducts of bisphenol A [PO (2 mole) adduct of bisphenol A, PO (3 mole) adduct of bisphenol A, PO (5 mole) adduct of bisphenol A, and the like]; and EO or PO adducts of resorcinols; and the like.

The Mn's of (all) are, from a viewpoint of mechanical properties of the polyurethane resin (U), generally 300 or more, preferably 300 to 10,000, and more preferably 300 to 6,000.

The polyester polyols (a12) include condensed polyester polyols, polylactone polyols, polycarbonate polyols, and castor oil-based polyols.

The condensed polyester polyols are polyester polyols obtained from low molecular weight (Mn being less than 300) polyhydric alcohols and polyvalent carboxylic acids having 2 to 10 carbon atoms or ester-forming derivatives thereof.

As the low molecular weight polyhydric alcohols, there may be used 2- to 8- or more-valent aliphatic polyhydric alcohols having Mn's of less than 300 and low mole adducts of alkylene oxide (EO; PO; 1,2-, 1,3-, 2,3-, or 1,4-butylene oxide; and the like; hereinafter abbreviated as AO) to 2- to 8- or more-valent phenols, the adducts having Mn's of less than 300.

Preferable among the low molecular weight polyhydric alcohols which may be used for the condensed polyester polyols are ethylene glycol, propylene glycol, 1,4-butanediol, neopentyl glycol, 1,6-hexane glycol, low mole EO or PO adducts of bisphenol A, and combined use thereof.

The polyvalent carboxylic acids having 2 to 10 carbon atoms or ester-forming derivatives thereof, which may be used for the condensed polyester polyols, include aliphatic dicarboxylic acids (succinic acid, adipic acid, azelaic acid, sebacic acid, fumaric acid, maleic acid, and the like), cycloaliphatic dicarboxylic acids (dimer acid and the like), aromatic dicarboxylic acids (terephthalic acid, isophthalic acid, phthalic acid, and the like), 3- or more-valent polycarboxylic acids (trimellitic acid, pyromellitic acid, and the like), acid anhydrides thereof (succinic anhydride, maleic anhydride, phthalic anhydride, trimellitic anhydride, and the like), acid chlorides thereof (adipic acid dichloride and the like), low molecular weight alkyl esters thereof (dimethyl succinate, dimethyl phthalate, and the like), and combined use thereof.

Specific examples of the condensed polyester polyols include polyethylene adipate diol, polybutylene adipate diol, polyhexamethylene adipate diol, polyhexamethylene isophthalate diol, polyneopentyl adipate diol, polyethylenepropylene adipate diol, polyethylenebutylene adipate diol, polybutylenehexamethylene adipate diol, polydiethylene adipate diol, poly(polytetramethylene ether) adipate diol, poly(3-methylpentylene adipate)diol, polyethylene azelate diol, polyethylene sebacate diol, polybutylene azelate diol, polybutylene sebacate diol, polyneopentyl terephthalate diol, and the like.

As commercially available condensed polyester polyols, there may be mentioned SANESTER 2610 (polyethylene adipate diol having an Mn of 1,000; produced by Sanyo Chemical Ind., Ltd.), SANESTER 2620 (polyethylene adipate diol having an Mn of 2,000; produced by Sanyo Chemical Ind., Ltd.), and the like.

The polylactone polyols are polyaddition products of lactones to the low molecular weight polyhydric alcohols mentioned above, wherein the lactones include lactones having 4 to 12 carbon atoms (for example, γ-butyrolactone, γ-valerolactone, and ε-caprolactone) and the like.

Specific examples of the polylactone polyols include, for example, polycaprolactone diol, polyvalerolactone diol, polycaprolactone triol, and the like.

The polycarbonate polyols include polycarbonate polyols produced by condensation through dealcoholization reaction of the above-mentioned low molecular weight polyhydric alcohols and low molecular weight carbonate compounds (for example, dialkyl carbonates containing alkyl groups having 1 to 6 carbon atoms, alkylene carbonates containing alkylene groups having 2 to 6 carbon atoms, and diaryl carbonates containing aryl groups having 6 to 9 carbon atoms), and the like. The low molecular weight polyhydric alcohols and low molecular weight alkylene carbonates may each be used in combinations of two or more kinds.

Specific examples of the polycarbonate polyols include polyhexamethylene carbonate diol, polypentamethylene carbonate diol, polytetramethylene carbonate diol, poly(tetramethylene/hexamethylene) carbonate diol (for example, a diol obtained by condensation through dealcoholization reaction of 1,4-butanediol and 1,6-hexanediol with dialkyl carbonates), and the like.

As commercially available polycarbonate polyols, there may be mentioned NIPPOLLAN 980R (polyhexamethylene carbonate diol having an Mn of 2,000; produced by Nippon Polyurethane Industry Co., Ltd.), T 4672 (poly(tetramethylene/hexamethylene) carbonate diol having an Mn of 2,000; produced by Asahi Kasei Chemicals Corporation), and the like.

The castor oil-based polyols include castor oil and modified castor oils which have been modified with polyols or AO. The modified castor oils can be produced by ester exchange between castor oil and polyols and/or addition of AO to castor oil. The castor oil-based polyols include castor oil, trimethylolpropane-modified castor oil, pentaerythritol-modified castor oil, EO (4 to 30 mole) adducts of castor oil, and the like.

Among the polyester polyols (a12), preferable are the condensed polyester polyols and polycarbonate polyols.

The low molecular weight polyols (a2) having Mn's of less than 300 include aliphatic 2-valent alcohols, aliphatic 3-valent alcohols, and 4- or more-valent aliphatic alcohols. Among (a2), preferable from a viewpoint of water resistance and thermal yellowing resistance are 2- to 3-valent aliphatic alcohols, where especially preferable as the aliphatic 2-valent alcohols are ethylene glycol, propylene glycol, 1,4-butanediol, neopentyl glycol, and 1,6-hexanediol; and especially preferable as the aliphatic 3-valent alcohols is trimethylolpropane.

As the polyisocyanate (b), an essential constituent of the polyurethane resin (U), there may be used those which have heretofore been used to produce polyurethane resins. The polyisocyanate (b) includes aromatic polyisocyanates (b1) having 6 to 20 carbon atoms (excluding the carbon atoms in the isocyanate groups; hereinafter the same shall apply), aliphatic polyisocyanates (b2) having 2 to 18 carbon atoms, alicyclic polyisocyanates (b3) having 4 to 15 carbon atoms, aromatic-aliphatic polyisocyanates (b4) having 8 to 15 carbon atoms, and derivatives of (b1) to (b4) (for example, isocyanurated compounds), all having 2 to 3 or more isocyanate groups.

The aromatic polyisocyanates (b1) having 6 to 20 carbon atoms include, for example, 1,3- or 1,4-phenylene diisocyanate, 2,4- or 2,6-tolylene diisocyanate (TDI), 4,4'- or 2,4'-diphenylmethane diisocyanate (MDI), 1,5-naphthylene diisocyanate, 4,4',4''-triphenylmethane triisocyanate, m- or p-isocyanatophenyl sulfonyl isocyanate, crude MDI, and the like.

The aliphatic polyisocyanates (b2) having 2 to 18 carbon atoms include, for example, ethylene diisocyanate, tetramethylene diisocyanate, hexamethylene diisocyanate (HDI), dodecamethylene diisocyanate, 2,2,4-trimethylhexamethylene diisocyanate, lysine diisocyanate, 2-isocyanatoethyl-2,6-diisocyanate hexanoate, and the like.

The alicyclic polyisocyanates (b3) having 4 to 15 carbon atoms include, for example, isophorone diisocyanate (IPDI), 4,4'-dicyclohexylmethane diisocyanate (hydrogenated MDI), cyclohexylene diisocyanate, methylcyclohexylene diisocyanate (hydrogenated TDI), bis(2-isocyanatoethyl)-4-cyclohexene-1,2-dicarboxylate, 2,5- or 2,6-norbornane diisocyanate, and the like.

The aromatic-aliphatic polyisocyanates (b4) having 8 to 15 carbon atoms include, for example, m- and/or p-xylylene diisocyanate (XDI), α,α,α',α'-tetramethylxylylene diisocyanate (TMXDI), and the like.

Among the polyisocyanates (b), preferable from a viewpoint of mechanical properties and weather resistance of the film obtained are (b2) and (b3), more preferable are (b3), and especially preferable are IPDI and hydrogenated MDI.

The compound (c) having a hydrophilic group and an active hydrogen atom include compounds (c1) having an anionic group and an active hydrogen atom and compounds (c2) having a cationic group and an active hydrogen atom.

As (c1), there may be mentioned compounds having a carboxyl group as the anionic group and having 2 to 10 carbon atoms [dialkylolalkanoic acids (for example, 2,2-dimethylolpropionic acid, 2,2-dimethylolbutanoic acid, 2,2-dimethylolheptanoic acid, and 2,2-dimethyloloctanoic acid), tartaric acid, and amino acids (for example, glycine, alanine, and valine), and the like], C2 to C16 compounds having a sulfonic acid group as the anionic group [3-(2,3-dihydroxypropoxy)-1-propanesulfonic acid, sulfoisophthalic acid di(ethylene glycol) ester, and the like], compounds having a sulfamic acid group as the anionic group and having 2 to 10 carbon atoms [N,N-bis(2-hydroxyethyl)sulfamic acid and the like], and salts obtained by neutralizing these compounds with neutralizing agents.

The neutralizing agents used for salts of (c1) include, for example, ammonia, amine compounds having 1 to 20 carbon atoms, or alkali metal hydroxides (sodium hydroxide, potassium hydroxide, lithium hydroxide, and the like).

The amine compounds having 1 to 20 carbon atoms include primary amines such as monomethylamine, monoethylamine, monobutylamine, and monoethanolamine; secondary amines such as dimethylamine, diethylamine, dibutylamine, diethanolamine, diisopropanolamine, and methylpropanolamine; and tertiary amines such as trimethylamine, triethylamine, dimethylethylamine, dimethylmonoethanolamine, and triethanolamine.

As the neutralizing agents used for salts of (c1), compounds having high vapor pressure at 25° C. are preferable from a viewpoint of drying characteristics of the aqueous polyurethane resin dispersion produced and water resistance of the film obtained. From such a viewpoint, the neutralizing agents used for salts of (c1) are preferably ammonia, monomethylamine, monoethylamine, dimethylamne, diethylamine, trimethylamine, triethylamine, and dimethylethylamine; more preferably ammonia, monoethylamine, dimethylamine, and diethyllamine; and especially preferably ammonia.

Among (c1), preferable from a viewpoint of resin properties of the film obtained and dispersion stability of the polyurethane dispersion are 2,2-dimethylolpropionic acid, 2,2-dimethylolbutanoic acid, and salts thereof; more preferable are neutralized salts of 2,2-dimethylolpropionic acid and 2,2-dimethylolbutanoic acid with ammonia or amine compounds having 1 to 20 carbon atoms.

The compounds (c2) having a cationic group and an active hydrogen atom include, for example, salts obtained by neutralization of compounds such as tertiary amino group-containing diols having 1 to 20 carbon atoms [N-alkyldialkanolamine (for example, N-methyldiethanolamine, N-propyldiethanolamine, N-butyldiethanolamine, and N-methyldipropanolamine), N,N-dialkylmonoalkanolamines (for example, N,N-dimethylethanolamine), and the like] and the like with neutralizing agents.

The neutralizing agents used for (c2) include, for example, monocarboxylic acids having 1 to 10 carbon atoms (for example, formic acid, acetic acid, propanoic acid, and the like), carbonic acid, dimethyl carbonate, dimethyl sulfate, methyl chloride, benzyl chloride, and the like.

As the neutralizing agents used for (c2), compounds having high vapor pressure at 25° C. are preferable from a viewpoint of drying characteristics of the aqueous polyurethane resin dispersion produced and water resistance of the film obtained. From such a viewpoint, the neutralizing agents used for (c2) are preferably monocarboxylic acids having 1 to 10 carbon atoms and carbonic acid, more preferably formic acid and carbonic acid, and especially preferably carbonic acid.

The neutralizing agents used for (c1) and (c2) may be added any time before a urethanization reaction, during the urethanization reaction, after the urethanization reaction, before an aqueous dispersion step, during the aqueous dispersion step, or after the aqueous dispersion step. However, from a viewpoint of stability of the urethane resin and stability of the aqueous dispersion, it is preferable to add the neutralizing agent before the aqueous dispersion step or during the aqueous dispersion step.

The amount of (c) used is adjusted so that the content of the hydrophilic groups in (U), based on the weight of (U), is generally 0.01 to 5 weight %, preferably 0.1 to 4 weight %, and more preferably 1 to 3 weight %.

In the present invention, the content of the hydrophilic groups means weight % of the unneutralized cationic groups or anionic groups and does not include the weight of the counter ions. For example, the content of the hydrophilic groups in (C1) refers, in a case of triethylmine salt of 2,2-dimethylolpropionic acid, to weight % of carboxyl groups (—COOH) and, in a case of triethylammonium salt of 3-(2,3-dihydroxypropoxy)-1-propanesulfonic acid, to weight % of sulfo groups (—SO$_3$H). In addition, the content of the hydrophilic groups in (c2) refers to weight % of only nitrogen atoms of the tertiary amino groups.

The chain extending agent (d) includes water, diamines having 2 to 10 carbon atoms (for example, ethylenediamine, propylenediamine, hexamethylenediamine, isophoronediamine, toluenediamine, and piperazine), polyalkylenepolyamines having 2 to 10 carbon atoms (for example, diethylenetriamine and triethylenetetramine), hydrazine or derivatives thereof (dibasic acid dihydrazides, for example, adipic acid dihydrazide and the like), aminoalcohols having 2 to 10 carbon atoms (for example, ethanolamine, diethanolamine, 2-amino-2-methylpropanol, and triethanolamine), and the like.

The reaction terminating agent (e) includes monoalcohols having 1 to 8 carbon atoms (methanol, ethanol, isopropanol, cellosolves, carbitols, and the like) and monoamines having 1 to 10 carbon atoms (mono- or di-alkylamines such as monomethylamine, monoethylamine, monobutylamine, dibutylamine, and monooctylamine; and mono- or di-alkanolamines such as monoethanolamine, diethanolamine, and diisopropanolamine).

The amounts of use of (d) and (e) affect the Mn, terminal amino group content, and urea group content of (U) and, accordingly, they have to be used in a range that does not damage the effect of the present invention. Specifically, they have to be used so that the Mn of (U) becomes the value which will be described later and, when amine compounds are used, they have to be used in a range that the terminal amino group content of (U) becomes the value which will be described later. In addition, it is preferable that they are used in such amounts that the urea group content of (U) becomes the value which will be described later.

The polyurethane resins may be used singly or in a combination of two or more kinds.

In the present invention, the polyurethane resin (U) may, if necessary, comprise additives such as an antioxidant, anti-discoloration agent, weathering stabilizer, plasticizer, and release agent. The amount of each of these additives used, based on the weight of (U), is generally 10 weight % or less, more preferably 3 weight % or less, and especially preferably 1 weight % or less.

From a viewpoint of dispersibility of (U) and stability of the aqueous dispersion, the aqueous polyurethane resin dispersion in the present invention is preferably obtained by dispersing (U) in water in the presence of a dispersant (h).

The dispersant (h) includes nonionic surfactants (h1), anionic surfactants (h2), cationic surfactants (h3), amphoteric surfactants (h4), and other emulsifying and dispersing agents (h5). The dispersant (h) may be used singly or in a combination of two or more kinds.

As (h1), there may be mentioned, for example, AO adduct-type nonionic surfactants and polyhydric alcohol-type non-ionic surfactants. The AO adduct types include EO adducts of aliphatic alcohols having 10 to 20 carbon atoms, EO adducts of phenol, EO adducts of nonylphenol, EO adducts of alkyl amines having 8 to 22 carbon atoms, EO adducts of polypropylene glycols, and the like. The polyhydric alcohol types include fatty acid (number of carbon atoms: 8 to 24) esters of polyhydric (3- to 8- or more-valent) alcohols (number of carbon atoms: 2 to 30) (for example, glycerol monostearate, glycerol monooleate, sorbitan monolaurate, sorbitan monooleate, and the like), alkyl (number of carbon atoms: 4 to 24) polyglycosides (degree of polymerization: 1 to 10), and the like.

As (h2), there may be mentioned, for example, ether carboxylic acids containing hydrocarbon groups having 8 to 24 carbon atoms or salts thereof [sodium lauryl ether acetate, sodium (poly)oxyethylene (number of moles added, 1 to 100) lauryl ether acetate, and the like]; sulfuric acid esters or ether sulfuric acid esters containing hydrocarbon groups having 8 to 24 carbon atoms and salts thereof [sodium lauryl sulfate, sodium (poly)oxyethylene (number of moles added: 1 to 100) lauryl sulfate, triethanolamine (poly)oxyethylene (number of moles added: 1 to 100) lauryl sulfate, sodium (poly)oxyethylene (number of moles added: 1 to 100) coconut oil fatty acid monoethanol amide sulfate, and the like]; salts of sulfonic acids containing hydrocarbon groups having 8 to 24 carbon atoms [sodium dodecylbenzene sulfonate and the like]; salts of sulfosuccinic acids containing one or two hydrocarbon groups having 8 to 24 carbon atoms; phosphoric acid esters or ether phosphoric acid esters containing hydrocarbon groups having 8 to 24 carbon atoms and salts thereof [sodium lauryl phosphate, sodium (poly)oxyethylene (number of moles added: 1 to 100) lauryl ether phosphate, and the like]; salts of fatty acids containing hydrocarbon groups having 8 to 24 carbon atoms [sodium laurate, triethanolamine laurate, and the like]; and salts of acylated amino acids containing hydrocarbon groups having 8 to 24 carbon atoms [sodium coconut oil fatty acid methyl taurin, sodium coconut oil fatty acid sarcosine, triethanolamine coconut oil fatty acid sarcosine, triethanolamine N-coconut oil fatty acid acyl-L-glutamate, sodium N-coconut oil fatty acid acyl-L-glutamate, sodium lauroyl methyl-β-alanine, and the like].

As (h3), there may be mentioned, for example, quaternary ammonium salt types [stearyltrimethylammonium chloride, behenyltrimethylammonium chloride, distearyldimethylammonium chloride, lanolin fatty acid aminopropylethyldimethylammonium ethyl sulfate, and the like] and amine salt types [lactic acid salt of diethylaminoethyl stearamide, dilaurylamine hydrochloride, oleylamine lactate, and the like].

As (h4), there may be mentioned, for example, betaine-type amphoteric surfactants [coconut oil fatty acid amide propyl dimethylamino acetic acid betaine, lauryl dimethylamino acetic acid betaine, 2-alkyl-N-carboxymethyl-N-hydroxyethyl imidazolinium betaine, lauryl hydroxy sulfobetaine, sodium lauroyl amidoethyl hydroxyethyl carboxymethyl betaine hydroxypropyl phosphate, and the like] and amino acid-type amphoteric surfactants [sodium β-lauryl aminopropionate and the like].

As (h5), there may be mentioned, for example, polyvinyl alcohol; starch and derivatives thereof; cellulose derivatives such as carboxymethyl cellulose, methyl cellulose, hydroxyethyl cellulose, and the like; carboxyl group-containing (co)polymers such as sodium polyacrylate; and emulsifying and dispersing agents having urethane groups or ester groups, described in U.S. Pat. No. 5,906,704 [for example, a compound obtained by linking a polycaprolactone polyol and a polyetherdiol with a polyisocyanate]; and the like.

The dispersant (h) may be added any time before the urethanization reaction, during the urethanization reaction, or after the urethanization reaction of (U); or before the aqueous dispersion step, during the aqueous dispersion step, or after the aqueous dispersing step of (U). However, from a viewpoint of dispersability of (U) and stability of the aqueous dispersion, it is preferable to add the dispersant before or during the aqueous dispersion step.

The content of (h), based on the weight of the polyurethane resin (U), is generally 0.01 to 20 weight %, preferably 0.1 to 10 weight %, and more preferably 1 to 5 weight %.

When (U) is a polyurethane resin having hydrophilic groups, the total of the content of (c) and content of (h), based on the weight of (U), is generally 0.3 to 20 weight %, preferably 0.6 to 10 weight %, and more preferably 1 to 5 weight %.

In the present invention, the content of urethane groups in the polyurethane resin (U), based on the weight of (U), is 0.5 to 5.0 mmol/g and, from a viewpoint of mechanical properties, durability, chemical resistance, abrasion resistance, and the like of the film obtained, preferably 0.8 to 4.2 mmol/g, and more preferably 1.1 to 3.4 mmol/g.

The content of the urethane groups in the polyurethane resin (U) can be controlled in a desired range by suitably adjusting the amounts of the polyol (a), polyisocyanate (b), compound (c) having a hydrophilic group and an active hydrogen atom, chain extending agent (d), and reaction terminating agent(e), with (c), (d), and (e) used if necessary.

In addition, the content of the urethane groups in the present invention is measured by a method described in Examples.

In general, a molecular terminal of a polyurethane resin becomes either a hydroxyl group derived from hydroxyl groups of the raw material or an amino group derived from a reaction of isocyanate groups with water or from amino groups of the raw material. Furthermore, in the step of dispersion of the polyurethane resin (U) in water, terminal amino groups are formed by hydrolysis of urethane groups, urea groups, allophanate groups, or biuret groups. These terminal amino groups have inferior water resistance compared to terminal hydroxyl groups and, therefore, polyurethane resins having higher content of terminal amino groups tend to show poor water resistance.

Accordingly, in the present invention, the content of the terminal amino groups in the polyurethane resin (U), based on the weight of (U), is not more than 0.35 mmol/g; and, from a viewpoint of water resistance, preferably not more than 0.2 mmol/g, more preferably not more than 0.15 mmol/g, and especially preferably not more than 0.1 mmol/g.

The content of the terminal amino groups in the polyurethane resin (U) can be controlled in a desired range by suitably adjusting the amounts of the polyol (a), polyisocyanate (b), and compound (c) having a hydrophilic group and an active hydrogen atom, chain extending agent (d), and reaction terminating agent (e), with (c), (d), and (e) used if necessary.

In addition, the content of the terminal amino groups in the present invention is measured by a method described in Examples.

In the present invention, from a viewpoint of the film forming property and water resistance of the film obtained, the content of the urea groups in the polyurethane resin (U), based on the weight of (U), is preferably not more than 2.0 mmol/g, more preferably not more than 0.2 mmol/g, especially preferably not more than 0.1 mmol/g, even more preferably not more than 0.05 mmol/g, and most preferably not more than 0.02 mmol/g.

To control the content of the urea groups in the polyurethane resin (U) in a desired range, it is only necessary to suitably adjust the amino group content, moisture, and isocyanate group content in the raw materials of (U).

In addition, the content of the urea groups in the present invention is measured by a method described in Examples.

In the present invention, from a viewpoint of the film-forming property and water resistance of the film obtained, the total of the contents of the allophanate groups and biuret groups in the polyurethane resin (U), based on the weight of (U), is preferably not more than 0.1 mmol/g, more preferably not more than 0.03 mmol/g, especially preferably not more than 0.01 mmol/g, even more preferably not more than 0.003 mmol/g, and most preferably not more than 0.001 mmol/g.

To control the total of the contents of the allophanate groups and biuret groups in the polyurethane resin (U) in a desired range, it is only necessary to suitably adjust the content of amino groups in the raw materials of (U), the ratio of equivalents of isocyanate groups to equivalents of hydroxyl groups and amino groups, temperature of the urethanization reaction, and the like. Especially, with regard to the reaction temperature, control thereof at 120° C. or lower or at 180° C. or higher can suppress formation of the allophanate groups and biuret groups.

In addition, the total content of the allophanate groups and biuret groups in the present invention is measured by a method described in Examples.

In the present invention, the content of the terminal isocyanate groups of the polyurethane resin (U) before dispersion in water, based on the weight of (U), is generally not more than 0.2 mmol/g, preferably not more than 0.15 mmol/g, more preferably not more than 0.1 mmol/g, and especially preferably not more than 0.05 mmol/g. Within this range, the contents of the urea groups and terminal amino groups of (U) after dispersion in water can be controlled in desired ranges and, thus, the effect of the present invention can be fully exhibited.

The content of the terminal isocyanate groups of (U) before dispersion in water can be controlled mainly by a ratio of the number of equivalents of isocyanate groups to the total number of equivalents of hydroxyl groups, amino groups, and water in the raw materials of (U); and by the degree of the urethanization reaction.

In the present invention, the Mn of the polyurethane resin (U) is 10,000 to 1,000,000 and, from a viewpoint of mechanical properties, durability, chemical resistance, abrasion resistance, and the like of the film obtained, preferably 10,000 to 500,000, more preferably 10,000 to 200,000, and most preferably 10,000 to 100,000.

The Mn of the polyurethane resin (U) can be controlled in a desired range by suitably adjusting the amounts of the polyol (a), polyisocyanate (b), and compound (c) having a hydrophilic group and an active hydrogen atom, chain extending agent (d), and reaction terminating agent (e), with (c), (d), and (e) used if necessary.

In the present invention, the ratio (Mw/Mn) of the weight average molecular weight (hereinafter abbreviated as Mw) to the Mn is 1.5 to 3.5 and, from a viewpoint of the film-forming property, preferably 1.75 to 3.25, and more preferably 2.0 to 3.0.

The Mw/Mn of the polyurethane resin (U) can be controlled in a desired range by suitably adjusting the conditions related to homogeneity of the urethanization reaction (for example, stirring and mixing). In addition, the Mw and Mn of (U) in the present invention are measured by a method described in Examples.

In the present invention, the melting temperature of the polyurethane resin (U) is 70 to 280° C. and, from a viewpoint of heat resistance, mechanical properties, durability, chemical resistance, abrasion resistance, and the like of the film obtained, preferably 80 to 200° C., and more preferably 90 to 150° C.

The melting temperature of the polyurethane resin (U) can be controlled in a desired range by suitably adjusting the amounts of the polyol (a), polyisocyanate (b), the compound (c) having a hydrophilic group and an active hydrogen atom, chain extending agent (d), and reaction terminating agent (e), with (c), (d), and (e) used if necessary.

In addition, the melting temperature in the present invention is measured by a method described in Examples.

In the present invention, a volume average particle diameter (Dv) of the polyurethane resin (U) is 0.01 to 1 μm and, from a viewpoint of dispersion stability of the aqueous polyurethane resin dispersion, preferably 0.02 to 0.7 μm, and more preferably 0.03 to 0.4 μm.

The volume average particle diameter (Dv) of (U) is determined by the hydrophilic groups in (U), amount of the dispersant, and type and operating conditions of the disperser used in the dispersion step. Therefore, to control the volume average particle diameter (Dv) of (U) in a desired range, it is only necessary in the dispersion step to use equipment selected from a rotary disperser, ultrasonic disperser, and kneader, which will be mentioned later, and to suitably adjust the content of the hydrophilic groups in (U) and content of the dispersant (h).

In addition, the volume average particle diameter (Dv) in the present invention is measured by a method described in Examples.

The aqueous polyurethane resin dispersion in the present invention may comprise organic solvents [ketone-type solvents (for example, acetone and methyl ethyl ketone), ester-type solvents (for example, ethyl acetate), ether-type solvents (for example, tetrahydrofuran), amide-type solvents (for example, N,N-dimethylformamide and N-methylpyrrolidone), alcohol-type solvents (for example, isopropyl alcohol), aromatic hydrocarbon-type solvents (for example, toluene), and the like]. However, from a viewpoint of odor, stability over time, environmental load, safety, production cost, and the like, the content of the organic solvent, based on the weight of the aqueous dispersion, is preferably not more than 1,000 ppm, more preferably not more than 500 ppm, especially preferably not more than 100 ppm, and most preferably the organic solvent is not substantially contained.

For the aqueous polyurethane resin dispersion in the present invention not to substantially contain organic solvents, it is preferable to use materials which do not substantially contain organic solvents as the raw materials for (U) and as the various additives used. It is also preferable not to use any organic solvent in the production step of (U) as well as the dispersion step of (U).

In the present invention, the polyurethane resin (U) is obtained by reacting the polyol (a), polyisocyanate (b), compound (c) having a hydrophilic group and an active hydrogen atom, chain extending agent (d), and reaction terminating agent (e), with (c), (d), and (e) used if necessary, by heating in heatable equipment. For example, there may be mentioned a method where the raw materials for (U) are charged in a vessel, stirred homogeneously, and thereafter heated without stirring in a heated-air dryer or a heating furnace; a method where the reaction is carried out by heating with stirring or kneading by using a simple pressure-resistant reactor (autoclave), reaction flask, uniaxial or biaxial kneader, plastmill, versatile mixer, or the like; and the like. Above all, the method of reacting by heating with stirring or kneading is preferable because it provides a higher homogeneity of the urethane resin (U) obtained and thus the film obtained tends to show better mechanical properties, durability, chemical resistance, abrasion resistance, and the like. Among the methods of reacting under heating with stirring or kneading, a method to use the uniaxial or biaxial kneader is preferable, which has excellent stirring intensity and heating capability. As the uniaxial or biaxial kneader, there may be exemplified a continuous kneader (produced by Kurimoto, Ltd.), a uniaxial kneader, a biaxial extruder, and the like.

When producing (U), the reaction temperature is preferably 100 to 250° C., more preferably 100 to 120° C. or 180 to 240° C., and most preferably 190 to 230° C. Furthermore, when producing (U), the amount of time can be suitably selected depending on the equipment used but is generally preferably 1 minute to 100 hours, more preferably 3 minutes to 30 hours, especially preferably 5 minutes to 10 hours. Within this range, there may be obtained (U) which can fully exhibit the effects of the present invention.

In order to control the rate of the urethanization reaction, there may be used heretofore known reaction catalysts (tin octoate, bismuth octoate, and the like), reaction retarders (phosphoric acid and the like), and the like. The amount of addition of these catalysts or reaction retarders, based on the amount of (U), is preferably 0.001 to 3 weight %, more preferably 0.005 to 2 weight %, and especially preferably 0.01 to 1 weight %.

From a viewpoint of ease of handling in the dispersion step of the polyurethane resin (U) in water, the shape of (U) before dispersion is preferably in a form of pellets or blocks having a size of 0.2 to 500 mm. The size is more preferably 0.5 to 100 mm, especially preferably 0.7 to 30 mm, and most preferably 1 to 10 mm.

To adjust the resin shape into pellets or blocks, there may be used means such as, for example, cutting, pelletization, granulation, pulverization, or the like. This adjustment of the resin shape into particles or blocks may be carried out in water or in the absence of water.

For example, there may be exemplified a method where the polyurethane resin (U) rolled into a sheet is granulated by means of a square pelletizer; a method where the sheet is cut into blocks by scissors, an ultrasonic cutter, and the like; a method where the polyurethane resin (U) taken out as strands is cut into pellets by means of a pelletizer; and the like.

As equipment for dispersing (U) in water, any equipment (A) may be used as long as it has dispersing capability. However, from a viewpoint of temperature control, feeding of a granular or block-shaped resin, dispersing capability, and the like, it is preferable to use a rotating dispersion mixer (A1), ultrasonic disperser (A2), or kneader (A3). Above all, more preferable is (A1), which has especially excellent dispersing capability.

The main principle of dispersion by the rotating dispersion mixer (A1) is to micronize and disperse the material to be treated by imparting external shearing force thereto by means of rotation of a driving unit and the like. In addition, (A1) may be operated under ordinary, reduced, or increased pressure.

As the rotating dispersion mixer (A1), for example, there may be exemplified T.K. HOMO MIXER (produced by PRIMIX Corporation), CLEARMIX (produced by M Technique Co., Ltd.), FILMIX (produced by PRIMIX Corporation), ULTRA-TURRAX (IKA Works GmbH & Co. KG), Ebara Milder (produced by Ebara Corporation), Cavitron (produced by Eurotec Co., Ltd.), BIO MIXER (produced by Nippon Seiki Co., Ltd.), and the like.

When dispersion-treating (U) by using the rotating dispersion mixer (A1), the rotational speed is, from a viewpoint of dispersing capability, generally 100 to 30,000 rpm, preferably 500 to 20,000 rpm, and more preferably 1,000 to 10,000 rpm.

The main principle of dispersion by the ultrasonic disperser (A2) is to micronize and disperse the material to be treated by imparting external energy thereto by means of vibration of a driving unit. In addition, (A2) may be operated under ordinary, reduced, or increased pressure.

As the ultrasonic disperser (A2), there may be used ultrasonic dispersers and the like, which are commercially available from Ikemoto Scientific Technology Co., Ltd., Cosmo Bio Co., Ltd., Ginsen Co., Ltd., and the like.

When dispersion-treating (U) by using the ultrasonic disperser (A2), the frequency of vibration is, from a viewpoint of dispersing capability, generally 1 to 100 kHz, preferably 3 to 60 kHz, and especially preferably 10 to 30 kHz.

The main principle of dispersion by the kneader (A3) is to micronize and disperse the material to be treated by imparting energy thereto by kneading with a rotor. In addition, (A3) may be operated under ordinary, reduced, or increased pressure.

As the kneader (A3), there may be exemplified biaxial extruders (PCM-30 produced by Ikegai Co., Ltd. and the like), kneaders (KRC Kneader produced by Kurimoto, Ltd. and the like), universal mixers (HIVIS MIX produced by PRIMIX corporation and the like), plastmills (Labo Plastmill produced by Toyo Seiki Seisakusho, Ltd. and the like), and the like.

When dispersion-treating (U) by using the kneader (A3), the rotational speed is, from a viewpoint of dispersing capability, generally 1 to 1,000 rpm, preferably 3 to 500 rpm, and especially preferably 10 to 200 rpm.

The aqueous polyurethane resin dispersion of the present invention is produced by dispersing the polyurethane resin (U) to intended fine particles by using the dispersing equipment (A), (U) being softened under heating in the dispersion step in water. Therefore, in the dispersion step, it is preferable to take measures so that the above-mentioned respective physical property values do not fluctuate because of deterioration such as hydrolysis and the like.

In order to suppress the deterioration, (U) is preferably dispersed in water at a temperature less than its melting temperature. The temperature when dispersing (U) in water is more preferably a temperature in a range from 25 to 180° C. and lower than the melting temperature of (U) by more than 5 to 100° C., and especially preferably a temperature in a range from 90 to 150° C. and lower than the melting temperature of (U) by 10 to 120° C.

To carry out dispersion of (U) at a temperature less than its melting temperature, it is preferable that (U) swells with water when dispersion-treated. The degree of swelling of (U) can be adjusted by suitably controlling the contents of aforementioned (c) and/or (h).

The weight ratio of (U) to water, which are fed to the dispersing equipment (A), is suitably selected depending on the intended content of the resin component of the aqueous dispersion. However, (U)/water is generally 10/2 to 10/100 and preferably 10/5 to 10/50.

Furthermore, the amount of time for treating (U) and water with the dispersing equipment (A) is, from a viewpoint of preventing decomposition, deterioration, and the like of (U) which has become a dispersion, generally 10 seconds to 10 hours, more preferably 1 minute to 3 hours, and most preferably 10 to 60 minutes.

When carrying out dispersion by means of the dispersing equipment (A), there may be added, if necessary, one or more kinds of additives selected from a pH adjuster, anti-foaming agent, foam suppressing agent, antioxidant, anti-discoloration agent, plasticizer, mold releasing agent, and the like. In addition, if necessary, there may be carried out solvent removal, concentration, dilution, and the like after the dispersion.

The solid content concentration (the content of components other than volatile components) of the aqueous polyurethane resin dispersion obtained by the production process of the present invention is, from a viewpoint of ease of handling aqueous dispersions, preferably 20 to 65 weight % and more preferably 25 to 55 weight %. The solid content concentration can be determined as follows: about 1 g of an aqueous dispersion is spread thinly on a petri dish and the weight of the dispersion is measured precisely; the petri dish is thereafter heated at 130° C. for 45 minutes by using a circulation-type constant-temperature dryer and, subsequently, the weight of the dried dispersion is weighed precisely; and by calculating the ratio (percentage) of the weight remaining after heating to the weight before heating, the solid content concentration is obtained.

The viscosity of the aqueous polyurethane resin dispersion obtained by the production process of the present invention is preferably 10 to 100,000 mPa·s and more preferably 10 to 5,000 mPa·s. The viscosity can be measured by using a BL-type viscometer at a constant temperature of 25° C.

The pH of the aqueous polyurethane resin dispersion obtained by the production process of the present invention is preferably 2 to 12 and more preferably 4 to 10. The pH can be measured by pH Meter M-12 (produced by HORIBA, Ltd.) at 25° C.

The aqueous polyurethane resin dispersion of the present invention may be used for water-based paint compositions, water-based adhesive compositions, water-based textile processing and treating agent compositions (binder compositions for pigment printing, binder compositions for non-woven textiles, bundling agent compositions for reinforcing fibers, binder compositions for antimicrobial agents, raw material compositions for artificial leather and synthetic leather, and the like), water-based coating compositions (waterproof coating compositions, water-repellant coating compositions, anti-fouling coating compositions, and the like), water-based paper treating agent compositions, water-based ink compositions, and the like. Especially, due to excellent film-forming properties and water resistance, the aqueous polyurethane resin dispersions of the present invention may preferably be used as water-based paint compositions, water-based adhesive compositions, and water-based textile processing and treating agents.

When used for these applications, if necessary, there may be added to the polyurethane resin dispersions one or two or more kinds of other additives such as, for example, auxiliary film-forming resins, cross-linking agents, catalysts, pigments, pigment dispersants, viscosity modifiers, anti-foaming agents, leveling agents, preservatives, deterioration preventive agents, stabilizers, and anti-freezing agents.

Hereinafter, there will be described preparation of water-based paints, wherein the aqueous polyurethane resin dispersion of the present invention is used.

In the water-based paints, for the purpose of aiding film-formation, improving binder functions, and the like, there may be used together, if necessary, other water dispersible resins or water soluble resins in addition to the urethane resin (U) in the aqueous polyurethane resin dispersion of the present invention.

Other water dispersible resins or water soluble resins used together in the water-based paints include, for example, water dispersible or water soluble polyurethane resins other than the polyurethane resin of the present invention, polyacrylic resins, polyester resins, and the like. These other resins may be suitably selected for each application of the water-based paints from the resins used commonly in each application and the like.

In the water-based paint, the solid content of the aqueous polyurethane resin dispersion of the present invention is, based on the weight of the water-based paint, generally 0.1 to 60 weight % and preferably 1 to 50 weight %.

In addition, the content of other resins in the water-based paint, based on the weight of the water-based paint, is generally not more than 60 weight % and preferably not more than 50 weight %.

The water-based paint may further comprise one or two or more kinds selected from cross-linking agents, pigments, pigment dispersants, viscosity modifiers, antifoaming agents, preservatives, deterioration preventive agents, stabilizers, anti-freezing agents, water, and the like.

The cross-linking agents include water-soluble or water-dispersible amino resins, water-soluble or water-dispersible polyepoxides, water-soluble or water-dispersible blocked polyisocyanate compounds, polyethylene ureas, and the like.

The amount of addition of the cross-linking agent, based on the weight of the solid content of the aqueous polyurethane dispersion, is generally not more than 30 weight % and preferably 0.1 to 20 weight %.

The pigments include inorganic pigments having solubility of not more than 1 in water (for example, white pigments, black pigments, gray pigments, red pigments, brown pigments, yellow pigments, green pigments, blue pigments, purple pigments, and metallic pigments), organic pigments (for example, natural organic pigments, synthetic organic pigments, nitroso pigments, nitro pigments, pigment/dye-type azo pigments, azo lakes prepared from water-soluble dyes, azo lakes prepared from sparingly soluble dyes, lakes prepared from basic dyes, lakes prepared from acidic dyes, xanthan lakes, anthraquinone lakes, pigments from vat dyes, and phthalocyanine pigments), and the like. The content of the pigment, based on the weight of the water-based paint, is generally not more than 50 weight % and preferably not more than 30 weight %.

The pigment dispersants include the dispersants (h) described above. The content of the pigment dispersant, based on the weight of the pigment, is generally not more than 20 weight % and preferably not more than 15 weight.

The viscosity modifiers include thickeners, for example, inorganic viscosity modifiers (sodium silicate, bentonite, and the like), cellulose-based viscosity modifiers (methyl cellulose, carboxymethyl cellulose, hydroxymethyl cellulose, and the like, having Mn of 20,000 or more), protein-based viscosity modofiers (casein, sodium caseinate, ammonium caseinate, and the like), acrylic viscosity modifiers (sodium polyacrylate, ammonium polyacrylate, and the like, having Mn of 20,000 or more), and vinyl-based viscosity modifiers (polyvinyl alcohol and the like, having Mn of 20,000 or more).

The anti-foaming agents include long-chain alcohols (octyl alcohol and the like), sorbitan derivatives (sorbitan monooleate and the like), silicone oils (polymethyl siloxane, polyether-modified silicone, and the like), and the like.

The preservatives include organic nitrogen-sulfur compound-based preservatives, halogenated organic sulfur compound-based preservatives, and the like.

The deterioration preventive agents and stabilizers (UV absorbers, antioxidants, and the like) include hindered phenol-, hindered amine-, hydrazine-, phosphorus-, benzophenone-, and benzotriazole-based deterioration preventive agents, stabilizers, and the like.

The anti-freezing agents include ethylene glycol, propylene glycol, and the like.

The contents of the viscosity modifiers, antifoaming agents, preservatives, deterioration preventive agents, stabilizers, and anti-freezing agents, based on the weight of the water-based paints, are each generally not more than 5 weight % and preferably not more than 3 weight %.

To the water-based paint, there may be further added solvents for a purpose of improving appearance of the coated film after drying. The solvents which may be added include monohydric alcohols having 1 to 20 carbon atoms (methanol, ethanol, propanol, and the like), glycols having 1 to 20 carbon atoms (ethylene glycol, propylene glycol, diethylene glycol, and the like), tri- or more-hydric alcohols having 1 to 20 carbon atoms (glycerin and the like), cellosolves having 1 to 20 carbon atoms (methyl and ethyl cellosolves, and the like), and the like. The content of the solvent added, based on the weight of the water-based paint, is preferably not more than 20 weight % and more preferably not more than 15 weight %.

The water-based paint using the aqueous polyurethane resin dispersion of the present invention is produced by mixing and stirring the aqueous polyurethane resin dispersion of the present invention and each component described above. When mixing, all components may be mixed at the same time; or each component may be added and mixed in stages.

The solid content concentration of the water-based paint is preferably 10 to 70 weight % and more preferably 15 to 60 weight %.

Hereinafter, the water-based adhesives using the aqueous polyurethane resin dispersion of the present invention will be described.

As a resin used for the aqueous adhesive, the urethane resin (U) in the aqueous polyurethane dispersion of the present invention may be used singly. However, there may be used together water dispersible or water soluble resins other than the urethane resin, the other resins represented by SBR latex resins or acrylic resins. When the resins are used together, the percentage of the polyurethane resin (U) in the total weight of the resins is preferably 1 weight % or more, and more preferably 10 weight % or more.

Furthermore, in a range where the cohesive property of the adhesive comprising the aqueous polyurethane resin dispersion of the present invention is not interfered, there may also be used secondary materials and additives which are used in common adhesives, such as, for example, the cross-linking agents, plasticizers, tackifiers, fillers, pigments, thickeners, antioxidants, UV absorbers, surfactants, and fire-retardants.

Hereinafter, there will be described preparation of the water-based textile processing and treating agents, wherein the aqueous polyurethane resin dispersion of the present invention is used. To the water-based textile processing and treating agents comprising the aqueous polyurethane resin dispersion of the present invention, if necessary, there may be blended heretofore known anti-foaming agents, wetting agents, various kinds of aqueous resin dispersions (aqueous polyurethane resin dispersions other than those of the present invention, aqueous acrylic dispersions, SBR latex, and the like), softening agents, and the like. The amount of these additives blended, as reduced to solid content in a case of aqueous resin dispersions, is preferably not more than 30 weight % and especially preferably not more than 20 weight %, based on the weight of the polyurethane resin (U). In case of other additives, the amount of each additive blended is preferably not more than 1 weight % and especially preferably 0.1 to 0.5 weight %. In addition, if necessary, there may be added pH adjusters. The pH adjusters include alkaline materials such as, for example, salts (sodium bicarbonate and the like) of strong base (alkali metals and the like) and weak acids (acids having pKa greater than 2.0; for example, carbonic acid and phosphoric acid) or acidic materials (acetic acid and the like). The amount of the pH adjuster used, based on the polyurethane resin (U), is generally 0.01 to 0.3 weight %.

The solid content (non-volatiles) concentration of the water-based textile processing and treating agent of the present invention is not particularly limited but is generally 10 to 50 weight % and preferably 15 to 45 weight %. In addition, the viscosity (25° C.) is generally 10 to 100,000 mPa·s.

EXAMPLES

Hereinafter, the present invention will be described specifically with reference to Examples. However, it should be understood that the present invention is not limited to these Examples. In the following, "parts" means "parts by weight."

Example 1

After mixing each raw material described in Table 1, the mixture was charged into KRC Kneader (produced by Kurimoto, Ltd.), a biaxial kneader, under a nitrogen atmosphere and kneaded at 220° C. for 10 minutes to carry out a urethanization reaction. The reaction product was taken out and, after being rolled by a pressing machine heated to 180° C., was cut by a square pelletizer (produced by HORAI Co., Ltd.) to obtain a polyurethane resin (U1-1). Subsequently, each raw material described in Table 3 was charged in a temperature-controllable pressure-resistant vessel and, by dispersion-treating the mixture by means of CLEARMIX (produced by M Technique Co., Ltd.) under the conditions described in Table 5, there was obtained an aqueous polyurethane resin dispersion (Q-1).

Example 2

After mixing each raw material described in Table 1, the mixture was charged into KRC Kneader, a biaxial kneader, under a nitrogen atmosphere and kneaded at 210° C. for 15 minutes to carry out a urethanization reaction. The reaction product was taken out and, after being rolled by a press machine heated to 180° C., was cut by a square pelletizer to obtain a polyurethane resin (U1-2). Subsequently, each raw material described in Table 3 was charged in a temperature-controllable pressure-resistant vessel and, by dispersion-treating the mixture by means of T.K. HOMO MIXER (produced by PRIMIX Corporation) under the conditions described in Table 5, there was obtained an aqueous polyurethane resin dispersion (Q-2).

Example 3

In a simple pressure-resistant reactor equipped with a stirrer and a heating device, each raw material described in Table 1 was charged and a urethanization reaction was carried out by stirring at 180° C. for 15 minutes to obtain a toluene solution of a polyurethane resin (U1-3). Subsequently, each raw material described in Table 3 was charged to a temperature-controllable pressure-resistant vessel and, by dispersion-treating the mixture by means of CLEARMIX under the conditions described in Table 5 and, thereafter, by distilling off toluene under reduced pressure at 90° C. for 5 hours, there was obtained an aqueous polyurethane resin dispersion (Q-3).

Example 4

After mixing each raw material described in Table 1, the mixture was charged in a release-treated vessel and was subjected to a urethanization reaction in a circulating air dryer of 210° C. for 15 minutes without stirring. After cooling to 25° C., the reaction product was taken out and cut with scissors to obtain a polyurethane resin (U1-4). Subsequently, each raw material described in Table 3 was charged in a temperature-controllable pressure-resistant vessel and, by dispersion-treating the mixture by means of an ultrasonic disperser (produced by Ikemoto Scientific Technology Co., Ltd.) under the conditions described in Table 5, there was obtained an aqueous polyurethane resin dispersion (Q-4).

Example 5

After mixing each raw material described in Table 1, the mixture was charged into KRC Kneader, a biaxial kneader, under a nitrogen atmosphere and kneaded at 210° C. for 15 minutes to carry out a urethanization reaction. Thereafter, the resin with its temperature being kept at 210° C. was extruded through fine pores into strands of 2 mm diameter, followed by cooling to 90° C. After introducing these in ion-exchanged water of 30° C., the strands were cut by a pelletizer to obtain a polyurethane resin (U1-5). Subsequently, each raw material described in Table 3 was charged in a temperature-controllable pressure-resistant vessel and, by dispersion-treating the mixture by means of an ultrasonic disperser under the conditions described in Table 5, there was obtained an aqueous polyurethane resin dispersion (Q-5).

Example 6

After mixing each raw material described in Table 1, the mixture was charged into KRC Kneader, a biaxial kneader, under a nitrogen atmosphere and kneaded at 210° C. for 15 minutes to carry out a urethanization reaction. Thereafter, the resin with its temperature being kept at 210° C. was extruded through fine pores into strands of 2 mm diameter, followed by cooling to 90° C. After introducing these into ion-exchanged water of 30° C., the strands were cut by a pelletizer to obtain a polyurethane resin (U1-6). Subsequently, each raw material described in Table 3 was charged into a universal mixer (produced by PRIMIX Corporation) and, by dispersion-treating the mixture under the conditions described in Table 5, there was obtained an aqueous polyurethane resin dispersion (Q-6).

Example 7

After mixing each raw material described in Table 1, the mixture was charged into KRC Kneader, a biaxial kneader, under a nitrogen atmosphere and kneaded at 210° C. for 5 minutes to carry out a urethanization reaction. The reaction product was taken out and, after being rolled by a press machine heated to 180° C., was cut by a square pelletizer to obtain a polyurethane resin (U1-7). Subsequently, each raw material described in Table 3 was charged in a temperature-controllable pressure-resistant vessel and, by dispersion-treating the mixture by means of CLEARMIX under the conditions described in Table 5, there was obtained an aqueous polyurethane resin dispersion (Q-7).

Example 8

After mixing each raw material described in Table 1, the mixture was charged into KRC Kneader, a biaxial kneader, under a nitrogen atmosphere and kneaded at 250° C. for 3 minutes to carry out a urethanization reaction. The reaction product was taken out and, after being rolled by a press machine heated to 180° C., was cut by a square pelletizer to obtain a polyurethane resin (U1-8). Subsequently, each raw material described in Table 3 was charged in a temperature-controllable pressure-resistant vessel and, by dispersion-treating the mixture by means of CLEARMIX under the conditions described in Table 5, there was obtained an aqueous polyurethane resin dispersion (Q-8).

Example 9

After mixing each raw material described in Table 1, the mixture was charged into KRC Kneader, a biaxial kneader, under a nitrogen atmosphere and kneaded at 210° C. for 15 minutes to carry out a urethanization reaction. The reaction product was taken out and, after being rolled by a press machine heated to 180° C., was cut by a square pelletizer to obtain a polyurethane resin (U1-9). Subsequently, each raw material described in Table 4 was charged in a temperature-controllable pressure-resistant vessel and, by dispersion-treating the mixture by means of CLEARMIX under the conditions described in Table 5 and thereafter by distilling off THF under reduced pressure for 5 hours at 50° C., there was obtained an aqueous polyurethane resin dispersion (Q-9).

Example 10

After mixing each raw material described in Table 1, the mixture was charged in a release-treated vessel and was subjected to a urethanization reaction in a circulating air dryer of 100° C. for 50 hours without stirring. The reaction product was taken out and, after being rolled by a press machine heated to 180° C., was cut by a square pelletizer to obtain a polyurethane resin (U1-10). Subsequently, each raw material described in Table 4 was charged in a temperature-controllable pressure-resistant vessel and, by dispersion-treating the mixture by means of CLEARMIX under the conditions described in Table 5, there was obtained an aqueous polyurethane resin dispersion (Q-10).

Example 11

After mixing each raw material described in Table 2, the mixture was charged into KRC Kneader, a biaxial kneader, under a nitrogen atmosphere and kneaded at 210° C. for 15 minutes to carry out a urethanization reaction. The reaction product was taken out and, after being rolled by a press machine heated to 180° C., was cut by a square pelletizer to obtain a polyurethane resin (U1-11). Subsequently, each raw material described in Table 4 was charged in a temperature-controllable pressure-resistant vessel and, by dispersion-treating the mixture by means of CLEARMIX under the conditions described in Table 5, there was obtained an aqueous polyurethane resin dispersion (Q-11).

Example 12

After mixing each raw material described in Table 2, the mixture was charged into KRC Kneader, a biaxial kneader, under a nitrogen atmosphere and kneaded at 210° C. for 15 minutes to carry out a urethanization reaction. The reaction product was taken out and, after being rolled by a press machine heated to 180° C., was cut by a square pelletizer to obtain a polyurethane resin (U1-12). Subsequently, each raw material described in Table 4 was charged in a temperature-controllable pressure-resistant vessel and, by dispersion-treating the mixture by means of CLEARMIX under the conditions described in Table 5, there was obtained an aqueous polyurethane resin dispersion (Q-12).

Example 13

After mixing each raw material described in Table 2, the mixture was charged into KRC Kneader, a biaxial kneader, under a nitrogen atmosphere and was kneaded at 210° C. for 15 minutes to carry out a urethanization reaction. The reaction product was taken out and, after being rolled by a press machine heated to 180° C., was cut by a square pelletizer to obtain a polyurethane resin (U1-13). Subsequently, each raw material described in Table 4 was charged in a temperature-controllable pressure-resistant vessel and, by dispersion-treating the mixture by means of CLEARMIX under the conditions described in Table 5, there was obtained an aqueous polyurethane resin dispersion (Q-13).

Example 14

After mixing each raw material described in Table 2, the mixture was charged in a release-treated vessel and was subjected to a urethanization reaction in a circulating air dryer of 150° C. for 20 hours without stirring. The reaction product was taken out and, after cooling to 25° C., was cut by an ultrasonic cutter to obtain a polyurethane resin (U1-14). Subsequently, each raw material described in Table 4 was charged in a temperature-controllable pressure-resistant vessel and, by dispersion-treating the mixture by means of CLEARMIX under the conditions described in Table 5, there was obtained an aqueous polyurethane resin dispersion (Q-14).

Example 15

After mixing each raw material described in Table 2, the mixture was charged into KRC Kneader, a biaxial kneader, under a nitrogen atmosphere and was kneaded at 210° C. for 15 minutes to carry out a urethanization reaction. The reaction product was taken out and, after being rolled by a press machine heated to 180° C., was cut by a square pelletizer to obtain a polyurethane resin (U1-15). Subsequently, each raw material described in Table 4 was charged in a temperature-controllable pressure-resistant vessel and, by dispersion-treating the mixture by means of CLEARMIX under the conditions described in Table 5, there was obtained an aqueous polyurethane resin dispersion (Q-15).

Example 16

After mixing each raw material described in Table 2, the mixture was charged into KRC Kneader, a biaxial kneader, under a nitrogen atmosphere and was kneaded at 210° C. for 15 minutes to carry out a urethanization reaction. The reaction product was taken out and, after being rolled by a press machine heated to 180° C., was cut by a square pelletizer to obtain a polyurethane resin (U1-16). Subsequently, each raw material described in Table 4 was charged in a temperature-controllable pressure-resistant vessel and by dispersion-treating the mixture by means of CLEARMIX under the conditions described in Table 5 and thereafter by distilling off toluene under reduced pressure at 90° C. for 5 hours, there was obtained an aqueous polyurethane resin dispersion (Q-16).

Comparative Example 1

In a simple pressure-resistant reactor equipped with a stirrer and a heating device, each raw material described in Table 2 was charged and a urethanization reaction was carried out by stirring at 85° C. for 10 hours to produce a urethane prepolymer solution in acetone. The isocyanate content per solid content of the urethane prepolymer solution in acetone was 0.42 mmol/g. In a simple pressure-resistant reactor, there was charged 397.56 parts of the urethane prepolymer solution in acetone obtained and under stirring at 40° C., 12.85 parts of triethylamine (a neutralizing agent) and 589.59 parts of water were added thereto. After stirring at 60 rpm for 3 min, 2.50 parts of ethylenediamine, a chain extending agent, was added and acetone was distilled off under reduced pressure at 65° C. over 8 hours to obtain an aqueous polyurethane resin dispersion (Q-17).

Comparative Example 2

Except that the raw materials and the amounts of addition thereof were changed to those described in Table 2, an aqueous polyurethane dispersion (Q-18) was obtained in the same manner as in Comparative Example 1. In addition, the isocyanate content per solid content of the urethane prepolymer solution in acetone was 0.42 mmol/g.

Comparative Example 3

In a simple pressure-resistant reactor equipped with a stirrer and a heating device, each raw material described in Table 2 was charged and a urethanization reaction was carried out by stirring at 85° C. for 10 hours to produce a urethane prepolymer solution in acetone. The isocyanate content per solid content of the urethane prepolymer solution in acetone was 0.55 mmol/g. To a simple pressure-resistant reactor, there was charged 396.60 parts of the urethane prepolymer solution in acetone obtained and, under stirring at 40° C., 5.34 parts of triethylamine (a neutralizing agent) and 598.06 parts of water were added thereto. After stirring at 60 rpm for 3 minutes, 3.24 parts of ethylenediamine, a chain extending agent, was added thereto. Subsequently, acetone was distilled off under reduced pressure at 65° C. over 8 hours to obtain an aqueous polyurethane resin dispersion (Q-19).

Various physical property values and evaluation results of the aqueous polyurethane resin dispersions (Q-1) to (Q-19), obtained in Examples 1 to 16 and Comparative Examples 1 to 3, are shown in Table 6 and Table 7. In addition, the methods of measurement of various physical properties and methods of evaluation used in the present invention are as follows.

<Urethane Group Content and Urea Group Content>

The urethane group content and urea group content of a polyurethane resin are calculated from an N atom content determined by a nitrogen analyzer, "ANTEK 7000" (produced by Antek Instruments, Inc.), a ratio of urethane groups and urea groups as quantified by $^1$H-NMR, and after-mentioned contents of allophanate groups and biuret groups. The $^1$H-NMR measurement is carried out according to a method described in "Structural study of polyurethane resins by NMR: Takeda Research Report, 34(2), 224-323 (1975)." That is, upon measurement of $^1$H-NMR, when an aliphatic isocyanate was used, the weight ratio of urea groups to urethane groups is measured from a ratio of the integral of a hydrogen peak due to the urea groups at a chemical shift of ca. 6 ppm to the integral of a hydrogen peak due to the urethane groups at a chemical shift of ca. 7 ppm, and from the weight ratio, above-mentioned N atom content, and contents of the allophanate groups and biuret groups, the contents of the urethane groups and urea groups are calculated. When an aromatic isocyanate was used, the weight ratio of urea groups to urethane groups is calculated from a ratio of the integral of a hydrogen peak due to the urea groups at a chemical shift of ca. 8 ppm to integral of the hydrogen peak due to the urethane groups at a chemical shift of ca. 9 ppm, and from the weight ratio and the above-mentioned N atom content, the urea group content is calculated.

<Terminal Isocyanate Group Content>

After dissolving a polyurethane resin in 30 ml of a 0.5 mol/l solution of di-n-butylamine in toluene, 100 ml of isopropyl alcohol is added thereto and, by using a titrating solution of 0.5 mol/l hydrochloric acid, automatic titration is performed with an automatic potentiometric titrator. The number of milliliters titrated is read off and the terminal isocyanate group content (mmol/g) is calculated according to the following equation:

$$\text{Terminal isocyanate group content(mmol/g)} = [0.5 \times (B-A) \times f \times 100]/S$$

where

A: the number of milliliters of the titrating solution of 0.5 mol/l hydrochloric acid, consumed in the titration of the sample;

B: the number of milliliters of the titrating solution of 0.5 mol/l hydrochloric acid, consumed in the blank titration;

f: the titer of the titrating solution of 0.5 mol/l hydrochloric acid; and

S: the amount (g) of the polyurethane resin sampled.

<Terminal Amino Group Content>

The total amine value and tertiary amine value of a polyurethane resin are obtained according to the following methods and the terminal amino group content (mmol/g) is calculated according to the following equation:

$$\text{Terminal amino group content(mmol/g)} = (\text{total amine value} - \text{tertiary amine value})/56.1$$

(1) Total Amine Value

After dissolving a polyurethane resin in 50 ml of toluene in a 100 ml flask, 20 ml of acetic anhydride is added thereto and the solution is titrated with a titrating solution of 0.5 mol/l hydrochloric acid in methyl alcohol using a mixed indicator of xylene cyanol FF and methyl orange (the end point is where the color of the indicator turned from green to red brown). The number of milliliters titrated is read off and the total amine value is calculated according to the following equation:

$$\text{Total amine value} = a \times f/(S \times 28.05)$$

where a: the number of milliliters titrated of the titrating solution of 0.5 mol/l hydrochloric acid in methyl alcohol;

f: the titer of the titrating solution of 0.5 mol/l hydrochloric acid in methyl alcohol; and S: the amount (g) of the polyurethane resin sampled.

(2) Tertiary Amine Value

After dissolving a polyurethane resin in 50 ml of toluene in a 100 ml flask, 20 ml of acetic anhydride is added thereto and the solution is shaken well and allowed to stand for 30 minutes at room temperature. The solution is titrated with a titrating solution of 0.5 mol/l hydrochloric acid in methyl alcohol using a mixed indicator of xylene cyanol FF and methyl orange (the endpoint is where the color of the indicator turned from green to red brown). The number of milliliters titrated is read off and the tertiary amine value is calculated according to the following equation:

$$\text{Tertiary amine value} = a \times f/(S \times 28.05)$$

where a: the number of milliliters titrated of the titrating solution of 0.5 mol/l hydrochloric acid in methyl alcohol;

f: the titer of the titrating solution of 0.5 mol/l hydrochloric acid in methyl alcohol; and S: the amount (g) of the polyurethane resin sampled.

<Contents of Allophanate Groups and Biuret Groups>

The total of contents of the allophanate groups and biuret groups of a polyurethane resin is calculated by means of a gas chromatograph ("Shimadzu GC-9A" (produced by Shimadzu Corporation)]. There is prepared 50 g of a DMF solution containing 0.01 weight % of di-n-butylamine and 0.01 weight % of naphthalene (internal standard). A sample of a polyurethane resin is weighed into a test tube with a stopper, 2 g of the above-described DMF solution is added thereto, and the test tube is heated for 2 hours in a constant-temperature water bath of 90° C. After cooling to room temperature, 10 μl of acetic anhydride is added thereto and the mixture is stirred by shaking for 10 minutes. Furthermore, 50 μl of di-n-propylamine is added thereto and, after shaking for 10 min, a gas chromatographic measurement is performed. A blank measurement is carried out in parallel and from the difference between the blank value and the value for the sample, the amount of the amine consumed is obtained. Then, the total of contents of the allophanate groups and biuret groups was calculated.

(Gas Chromatographic Conditions)
Instrument: Shimadzu GC-9A;
Column: 10% PEG-20M on Chromosorb WAW DMLS 60/80 mesh glass column, 3 mmϕ×2 m;
Column temperature: 160° C., temperature of the sample introduction section: 200° C., carrier gas: nitrogen 40 ml/minute; and
Detector: FID, sample injection volume: 2 μl.

(Computational Equation for Total of Contents of Allophanate Groups and Biuret Groups)

Total of contents of allophanate groups and biuret groups=$[(B-A)/B]\times 0.00155/S$ where
A: (peak area of di-n-butylacetamide)/(peak area of naphthalene) of the sample;
B: (peak area of di-n-butylacetamide)/(peak area of naphthalene) of the blank; and
S: the amount (g) of the polyurethane resin sampled.

<Mw and Mn>

A polyurethane resin or aqueous polyurethane dispersion is added to DMF so that the solid content (polyurethane resin) of the solution becomes 0.0125 weight % and, after stirring and dissolving at room temperature for 1 hour, the solution was filtered through a filter having a pore size of 0.3 μm. The Mw and Mn of the urethane resin contained in the filtrate obtained were measured by means of GPC using DMF as the solvent and with polystyrene as the molecular weight standard.

<Melting Temperature>

The melting temperature of a polyurethane resin in the present invention is the temperature where the melt mass flow of the resin becomes 10 g/10 min under a load of 2.16 kg, as measured according to JIS K7210 (Plastics—Determination of the melt-flow rate (MFR) of thermoplastics) by using "Melt Indexer Model I" (produced by Tester Sangyo Co., Ltd.) as the melt mass flow rate measuring instrument.

<Volume Average Particle Diameter (Dv)>

After diluting an aqueous polyurethane resin dispersion with ion-exchanged water so that the solid content of the polyurethane resin became 0.01 weight, the volume average particle diameter (Dv) was measured by using a light-scattering particle size distribution analyzer, "ELS-8000" (produced by Otsuka Electronics Co., Ltd.).

<Dispersion Stability of Aqueous Polyurethane Resin Dispersion>

An aqueous polyurethane resin dispersion with its temperature adjusted to 25° C. was allowed to stand for 12 hours and thereafter formation of deposits was visually evaluated. When there was no deposit formation, the dispersion stability was evaluated as "Good" and when there was deposit formation, the same was evaluated as "Bad."

<Water Resistance of Dried Film>

Into a mold made of polypropylene, the mold having a size of 10 cm length×20 cm width×1 cm depth, 10 parts of an aqueous polyurethane resin dispersion was flowed in such an amount that the film thickness after drying became 200 μm, dried at room temperature for 12 hours, and thereafter dried in a circulating air dryer by heating at 105° C. for 3 hours. The film thus obtained was immersed in ion-exchanged water of 60° C. for 14 days and the surface condition of the film was visually observed. When there was no change, water resistance was evaluated as "Good" and when the film was whitened, the same was evaluated as "Bad." Furthermore, the film taken out was dried and measurement of physical properties of the dried film was carried out. When the rate of change of elongation at break before and after immersion in water was 0.95 or more, water resistance was evaluated as "Exc(ellent)"; when the ratio was 0.9 or more to less than 0.95, water resistance was evaluated as "Good"; when the ratio was 0.8 or more to less than 0.9, water resistance was evaluated as "Poor"; and when the ratio was less than 0.8, water resistance was evaluated as "Bad." In addition, the measurement of elongation at break was carried out according to "5. Tensile Test" described in JIS K7311.

<Film-Forming Property of an Aqueous Polyurethane Resin Dispersion>

Into a mold made of polypropylene, the mold having a size of 10 cm length×20 cm width×1 cm depth, 10 parts of an aqueous polyurethane resin dispersion was flowed in such an amount that the film thickness after drying of the moisture became 200 μm. After drying at 25° C. for 48 hours, it was judged whether a film was formed or not. When a film was formed, the film-forming property was evaluated as "Good" and when there was no film-formation, the film-forming property was evaluated as "Bad."

TABLE 1

[Polyurethane resin-amount of raw materials charged (parts)]

| | | Example | | | | | | | | | |
|---|---|---|---|---|---|---|---|---|---|---|---|
| | | 1 | 2 | 3 | 4 | 5 | 6 | 7 | 8 | 9 | 10 |
| (a) | T 4672 | — | 534.93 | — | — | — | — | — | — | 443.16 | — |
| | PTMG 2000 | 542.76 | — | — | 635.65 | 737.24 | 580.51 | — | 67.77 | — | 456.75 |
| | PTMG 3000 | — | — | — | — | — | — | 777.00 | — | — | — |
| | SANESTER 2620 | — | — | 176.25 | — | — | — | — | — | — | — |
| | 1,4-Butanediol | 46.50 | 46.86 | 23.66 | 86.80 | 11.56 | — | 12.76 | 32.43 | 7.06 | 0.71 |
| | 1,6-Hexanediol | — | — | — | — | — | — | — | — | — | — |
| | Trimethylolpropane | — | — | — | — | — | — | — | — | 9.95 | — |
| | Ethylene glycol | — | — | — | — | — | 46.22 | — | — | — | — |
| (b) | 4,4'-Dicyclohexylmethane diisocyanate | 339.27 | 339.27 | — | — | — | 339.27 | 176.24 | 644.77 | 390.93 | — |
| | Isophorone diisocyanate | — | — | 90.86 | — | — | — | — | — | — | 369.39 |
| | Hexamethylene | — | — | — | 247.67 | — | — | — | — | — | — |

TABLE 1-continued

[Polyurethane resin-amount of raw materials charged (parts)]

| | | Example | | | | | | | | | |
|---|---|---|---|---|---|---|---|---|---|---|---|
| | | 1 | 2 | 3 | 4 | 5 | 6 | 7 | 8 | 9 | 10 |
| | diisocyanate | | | | | | | | | | |
| | 4,4'-Diphenylmethane diisocyanate | — | — | — | — | 217.20 | — | — | — | — | — |
| (c) | 2,2-Dimethylolpropionic acid | 71.47 | — | 8.93 | 29.78 | — | — | — | — | 148.90 | 148.90 |
| | 2,2-Dimethylolbutanoic acid | — | 78.94 | — | — | — | — | — | — | — | — |
| | N-Methyldiethanolamine | — | — | — | — | 34.00 | 34.00 | 34.00 | 255.03 | — | — |
| (d) | Ethylenediamine | — | — | — | — | — | — | — | — | — | 24.25 |
| | Ion-exchanged water | — | — | — | — | — | — | — | — | — | — |
| Organic solvent | Toluene | — | — | 700.00 | — | — | — | — | — | — | — |
| | N-Methylpyrrolidone | — | — | — | — | — | — | — | — | — | — |
| | Acetone | — | — | — | — | — | — | — | — | — | — |
| Catalyst | Bismuth octoate | — | — | 0.30 | 0.10 | — | — | — | — | — | — |
| Total | | 1000.00 | 1000.00 | 1000.00 | 1000.00 | 1000.00 | 1000.00 | 1000.00 | 1000.00 | 1000.00 | 1000.00 |

TABLE 2

[Polyurethane resin or urethane prepolymer solution-amount of raw materials charged (parts)]

| | | Example | | | | | | Comparative Example | | |
|---|---|---|---|---|---|---|---|---|---|---|
| | | 11 | 12 | 13 | 14 | 15 | 16 | 1 | 2 | 3 |
| (a) | T 4672 | — | — | — | — | — | 609.26 | — | 354.49 | — |
| | PTMG 2000 | 541.73 | 502.27 | — | 565.26 | — | — | 359.18 | — | 396.39 |
| | PTMG 3000 | — | — | — | — | 931.56 | — | — | — | — |
| | SANESTER 2620 | — | — | 448.20 | — | — | — | — | — | — |
| | 1,4-Butanediol | 44.55 | 31.18 | 66.65 | 93.06 | — | — | 0.30 | 0.51 | 26.88 |
| | 1,6-Hexanediol | — | — | — | — | — | 141.15 | — | — | — |
| | Trimethylolpropane | — | — | — | — | — | — | — | — | — |
| | Ethylene glycol | — | — | — | — | — | — | — | — | — |
| (b) | 4,4'-Dicyclohexylmethane diisocyanate | 339.27 | 364.33 | 273.24 | 341.48 | — | — | 197.64 | 197.64 | — |
| | Isophorone diisocyanate | — | — | — | — | 68.24 | — | — | — | — |
| | Hexamethylene diisocyanate | — | — | — | — | — | 249.59 | — | — | 158.80 |
| | 4,4'-Diphenylmethane diisocyanate | — | — | — | — | — | — | — | — | — |
| (c) | 2,2-Dimethylolpropionic acid | 74.45 | — | 11.91 | — | — | — | 42.88 | — | 17.87 |
| | 2,2-Dimethylolbutanoic acid | — | 98.68 | — | — | — | — | — | 47.36 | — |
| | N-Methyldiethanolamine | — | — | — | — | — | — | — | — | — |
| (d) | Ethylenediamine | — | — | — | — | — | — | — | — | — |
| | Ion-exchanged water | — | 3.54 | — | — | — | — | — | — | — |
| Organic solvent | Toluene | — | — | — | — | — | — | — | — | — |
| | N-Methylpyrrolidone | — | — | 200.00 | — | — | — | — | — | — |
| | Acetone | — | — | — | — | — | — | 400.00 | 400.00 | 400.00 |
| Catalyst | Bismuth octoate | — | — | — | 0.20 | 0.20 | — | — | — | 0.06 |
| Total | | 1000.00 | 1000.00 | 1000.00 | 1000.00 | 1000.00 | 1000.00 | 1000.00 | 1000.00 | 1000.00 |

TABLE 3

[Aqueous polyurethane resin dispersion-amount of raw materials charged (parts)]

| | | Example 1 | Example 2 | Example 3 | Example 4 | Example 5 | Example 6 | Example 7 | Example 8 |
|---|---|---|---|---|---|---|---|---|---|
| Polyurethane resin used (U1) | | U1-1 | U1-2 | U1-3 | U1-4 | U1-5 | U1-6 | U1-7 | U1-8 |
| Weight parts of (U1) | | 285.71 | 285.71 | 285.71 | 285.71 | 285.71 | 285.71 | 285.71 | 285.71 |
| Ion-exchanged water | | 703.93 | 698.90 | 712.59 | 707.88 | 693.31 | 709.76 | 670.94 | 64.04 |
| Neutralizing agent for (c) | Triethylamine | — | 15.39 | — | 6.41 | — | — | — | — |
| | 25% Aqueous ammonia | 10.36 | — | — | — | — | — | — | — |
| | Dimethylmonoethanolamine | — | — | 1.70 | — | — | — | — | — |
| | Methylpropanolamine | — | — | — | — | — | — | — | — |
| | Dimethyl sulfate | — | — | — | — | 12.41 | — | — | — |
| | Formic acid | — | — | — | — | — | 4.53 | — | — |
| | 10% Carbonated water | — | — | — | — | — | — | 43.35 | 650.25 |

TABLE 3-continued

[Aqueous polyurethane resin dispersion-amount of raw materials charged (parts)]

|  |  | Example 1 | Example 2 | Example 3 | Example 4 | Example 5 | Example 6 | Example 7 | Example 8 |
|---|---|---|---|---|---|---|---|---|---|
| Dispersant (h) | Glycerin monostearate | — | — | — | — | 8.57 | — | — | — |
|  | Dilaurylamine hydrochloride | — | — | — | — | — | — | — | — |
|  | Sodium lauryl sulfate | — | — | — | — | — | — | — | — |
| Organic solvent | Tetrahydrofuran | — | — | — | — | — | — | — | — |
|  | N-Methylpyrrolidone | — | — | — | — | — | — | — | — |
|  | Toluene | — | — | — | — | — | — | — | — |
| Total |  | 1000.00 | 1000.00 | 1000.00 | 1000.00 | 1000.00 | 1000.00 | 1000.00 | 1000.00 |

TABLE 4

[Aqueous polyurethane resin dispersion-amount of raw materials charged (parts)]

|  |  | Example 9 | Example 10 | Example 11 | Example 12 | Example 13 | Example 14 | Example 15 | Example 16 |
|---|---|---|---|---|---|---|---|---|---|
| Polyurethane resin used (U1) |  | U1-9 | U1-10 | U1-11 | U1-12 | U1-13 | U1-14 | U1-15 | U1-16 |
| Weight parts of (U1) |  | 285.71 | 90.91 | 285.71 | 285.71 | 285.71 | 285.71 | 600.00 | 285.71 |
| Ion-exchanged water |  | 543.18 | 888.48 | 703.50 | 695.63 | 706.85 | 642.86 | 340.00 | 528.57 |
| Neutralizing agent for (c) | Triethylamine | — | — | — | — | — | — | — | — |
|  | 25% Aqueous ammonia | — | 20.61 | 10.79 | 12.95 | 1.73 | — | — | — |
|  | Dimethylmono-ethanolamine | — | — | — | — | — | — | — | — |
|  | Methylpropanolamine | 28.25 | — | — | — | — | — | — | — |
|  | Dimethyl sulfate | — | — | — | — | — | — | — | — |
|  | Formic acid | — | — | — | — | — | — | — | — |
|  | 10% Carbonated water | — | — | — | — | — | — | — | — |
| Dispersant (h) | Glycerin monostearate | — | — | — | — | 5.71 | 14.29 | — | — |
|  | Dilaurylamine hydrochloride | — | — | — | — | — | — | 60.00 | — |
|  | Sodium lauryl sulfate | — | — | — | 5.71 | — | — | — | 14.29 |
| Organic solvent | Tetrahydrofuran | 142.86 | — | — | — | — | — | — | — |
|  | N-Methylpyrrolidone | — | — | — | — | — | 57.14 | — | — |
|  | Toluene | — | — | — | — | — | — | — | 171.43 |
| Total |  | 1000.00 | 1000.00 | 1000.00 | 1000.00 | 1000.00 | 1000.00 | 1000.00 | 1000.00 |

TABLE 5

|  | Disperser | Operating condition of disperser | | | Dispersion treatment time (minute) |
|---|---|---|---|---|---|
|  |  | Rotational speed (rpm) | Frequency (kHz) | Dispersion temperature (° C.) |  |
| Example 1 | CLEARMIX | 10000 | — | 130 | 3 |
| Example 2 | T.K. HOMO MIXER | 16000 | — | 130 | 3 |
| Example 3 | CLEARMIX | 1000 | — | 120 | 3 |
| Example 4 | Ultrasonic disperser | — | 30 | 125 | 0.1 |
| Example 5 | Ultrasonic disperser | — | 10 | 100 | 0.5 |
| Example 6 | Universal mixer | 10 | — | 95 | 200 |
| Example 7 | CLEARMIX | 20000 | — | 100 | 5 |
| Example 8 | CLEARMIX | 10000 | — | 130 | 3 |
| Example 9 | CLEARMIX | 5000 | — | 150 | 3 |
| Example 10 | CLEARMIX | 21000 | — | 175 | 1 |
| Example 11 | CLEARMIX | 10000 | — | 120 | 3 |
| Example 12 | CLEARMIX | 10000 | — | 125 | 3 |
| Example 13 | CLEARMIX | 10000 | — | 120 | 5 |
| Example 14 | CLEARMIX | 10000 | — | 120 | 5 |
| Example 15 | CLEARMIX | 5000 | — | 70 | 100 |
| Example 16 | CLEARMIX | 200 | — | 95 | 300 |

TABLE 6

| | | Example | | | | | | | | | |
|---|---|---|---|---|---|---|---|---|---|---|---|
| | | 1 | 2 | 3 | 4 | 5 | 6 | 7 | 8 | 9 | 10 |
| Aqueous polyurethane resin dispersion | | Q-1 | Q-2 | Q-3 | Q-4 | Q-5 | Q-6 | Q-7 | Q-8 | Q-9 | Q-10 |
| Urethane group content of (U) (mmol/g) | | 2.58 | 2.58 | 2.70 | 2.94 | 1.57 | 2.58 | 1.34 | 4.92 | 2.98 | 2.51 |
| Terminal amino group content of (U) (mmol/g) | | 0.01 | 0.01 | 0.01 | 0.01 | 0.17 | 0.20 | 0.01 | 0.02 | 0.01 | 0.20 |
| Urea group content of (U) (mmol/g) | | 0.004 | 0.004 | 0.020 | 0.004 | 0.061 | 0.004 | 0.005 | ND | 0.003 | 0.800 |
| Total of contents of allophanate and biuret groups of (U) (mmol/g) | | ND | ND | ND | ND | 0.01 | ND | ND | ND | ND | ND |
| Number average molecular weight (Mn) of (U) | | 28700 | 27000 | 21200 | 24300 | 13800 | 25700 | 39500 | 11200 | 687000 | 11000 |
| Weight average molecular weight (Mw) of (U) | | 57400 | 56600 | 34200 | 72800 | 26100 | 56400 | 79000 | 25800 | 1900000 | 30800 |
| Mw/Mn of (U) | | 2.0 | 2.1 | 1.6 | 3.0 | 1.9 | 2.2 | 2.0 | 2.3 | 2.8 | 2.8 |
| Melting temperature of (U) (° C.) | | 145 | 145 | 150 | 155 | 100 | 145 | 95 | 150 | 175 | 250 |
| Volume average particle diameter of (U) (μm) | | 0.10 | 0.10 | 0.45 | 0.46 | 0.22 | 0.41 | 0.39 | 0.31 | 0.02 | 0.02 |
| Solid content concentration of (Q) (wt %) | | 28.6 | 28.6 | 10.7 | 28.6 | 30.7 | 28.6 | 28.6 | 28.6 | 36.6 | 9.1 |
| Viscosity of (Q) | | 300 | 300 | 20 | 60 | 140 | 70 | 70 | 90 | 1600 | 460 |
| Dispersion stability of (Q) | | Good | Good | Good | Good | Good | Good | Good | Good | Good | Good |
| Water resistance of dried film of (Q) | Visual observation | Good | Good | Good | Good | Good | Good | Good | Good | Good | Good |
| | Retention of elongation at break | Exc | Exc | Exc | Exc | Good | Exc | Exc | Exc | Exc | Good |
| Film-forming property of (Q) | | Good | Good | Good | Good | Good | Good | Good | Good | Good | Good |

(ND: not detected)

TABLE 7

| | | Example | | | | | | Comparative Example | | |
|---|---|---|---|---|---|---|---|---|---|---|
| | | 11 | 12 | 13 | 14 | 15 | 16 | 1 | 2 | 3 |
| Aqueous polyurethane resin dispersion | | Q-11 | Q-12 | Q-13 | Q-14 | Q-15 | Q-16 | Q-17 | Q-18 | Q-19 |
| Urethane group content of (U) (mmol/g) | | 2.58 | 2.40 | 2.60 | 2.60 | 0.61 | 2.96 | 1.68 | 1.68 | 2.10 |
| Terminal amino group content of (U) (mmol/g) | | 0.01 | 0.06 | 0.01 | 0.01 | 0.07 | 0.29 | 0.42 | 0.43 | 0.55 |
| Urea group content of (U) (mmol/g) | | 0.004 | 0.200 | 0.005 | 0.004 | 0.005 | 0.004 | 0.55 | 0.54 | 0.71 |
| Total of contents of allophanate and biuret groups of (U) (mmol/g) | | ND | ND | ND | 0.03 | ND | ND | 0.04 | 0.02 | 0.06 |
| Number average molecular weight (Mn) of (U) | | 27000 | 12300 | 39600 | 59300 | 95000 | 35400 | 24200 | 23700 | 31000 |
| Weight average molecular weight (Mw) of (U) | | 56600 | 33100 | 63300 | 201000 | 170000 | 67300 | 100500 | 110000 | 150000 |
| Mw/Mn of (U) | | 2.1 | 2.7 | 1.6 | 3.4 | 1.8 | 1.9 | 4.2 | 4.6 | 4.8 |
| Melting temperature of (U) (° C.) | | 140 | 155 | 140 | 140 | 70 | 155 | 175 | 185 | 175 |
| Volume average particle diameter of (U) (μm) | | 0.08 | 0.05 | 0.50 | 0.48 | 0.20 | 0.47 | 0.1 | 0.1 | 0.46 |
| Solid content concentration of (Q) (wt %) | | 28.6 | 29.1 | 23.4 | 30.0 | 66.0 | 36.2 | 28.6 | 28.6 | 28.6 |
| Viscosity of (Q) | | 360 | 580 | 470 | 60 | 330 | 60 | 350 | 320 | 80 |
| Dispersion stability of (Q) | | Good | Good | Good | Good | Good | Good | Good | Good | Good |
| Water resistance of dried film of (Q) | Visual observation | Good | Good | Good | Good | Good | Good | Bad | Bad | Bad |
| | Retention of elongation at break | Exc | Exc | Exc | Good | Exc | Exc | Bad | Poor | Bad |
| Film-forming property of (Q) | | Good | Good | Good | Good | Good | Good | Bad | Bad | Bad |

(ND: not detected)

Evaluation Example 1

Evaluation as an Aqueous Paint

By using a paint conditioner, 90 parts of ion-exchanged water, 70 parts of a thickener ("VISRIZER AP-2," produced by Sanyo Chemical Ind., Ltd.), 10 parts of a pigment dispersant ("CARRYBON L-400," produced by Sanyo Chemical Ind., Ltd.), 140 parts of titanium oxide ("CR-93," produced by Ishihara Sangyo Kaisha, Ltd.), carbon black ("FW 200P," produced by Degussa Corporation), and 160 parts of calcium carbonate were mixed and dispersed for 30 minutes. Hereto were charged 20 parts of 1-nonanol, 200 parts of an aqueous acrylic dispersion ("Polytron Z330," produced by Asahi Kasei Corporation), and 200 parts of the aqueous polyurethane dispersion (Q-1) obtained in Example 1, and the mixture was mixed and dispersed for 10 minutes. Further, the viscosity at 25° C. was adjusted to 150 mPa·s using ion-exchanged water to obtain a water-based paint (W-1). In addition, the viscosity was measured by using a rotational viscometer produced by TOKIMEC Inc. at a rotational speed of 60 rpm. The water-based paint (W-1) was evaluated for water resistance of the paint film and film-forming property of the paint according to the test methods described below. The results are shown in Table 8.

Comparative Evaluation Example 1

Except that the aqueous polyurethane resin dispersion (Q-17) was used instead of the aqueous polyurethane resin dispersion (Q-1), a comparative water-based paint (W'-1) was obtained in the same manner as in Evaluation Example 1.

The water-based paint (W'-1) was evaluated for water resistance of the paint film and film-forming property of the paint according to the test methods described below. The results are shown in Table 8.

<Method for Evaluating Water Resistance of Paint Film>

The water-based paint obtained was spray-coated on a 10 cm×20 cm steel plate and heated at 120° C. for 10 minutes to prepare a paint film of 20 μm thickness. This coated steel plate was immersed in ion-exchanged water of 80° C. for 14 days, taken out and wiped lightly on the surface, and the film surface was visually evaluated according to the following evaluation criteria:

Good: there is no change on the film surface before and after the immersion; and Bad: the paint has partially peeled off after the immersion.

<Method for Evaluating Film-Forming Property of Paint>

The water-based paint obtained was spray-coated on a 10 cm×20 cm steel plate and heated at 80° C. for 3 minutes to prepare a paint film of 20 μm thickness. This coated steel plate was immersed in ion-exchanged water of 25° C. for 10 minutes, taken out and wiped lightly on the surface with a cloth, and evaluation was performed visually according to the following evaluation criteria:

Good: there is no color migration to the cloth; and

Bad: color migration to the cloth is observed.

TABLE 8

|  | Evaluation Example 1 | Comparative Evaluation Example 1 |
| --- | --- | --- |
| Water-based paint | W-1 | W'-1 |
| Water resistance of paint film | Good | Bad |
| Film-forming property of paint | Good | Bad |

Evaluation Example 2

Evaluation as an Aqueous Adhesive

To 100 parts of the aqueous polyurethane resin dispersion (Q-4) obtained in Example 4, there was added and mixed 6 parts of an isocyanurate trimer of 1,6-hexamethylene diisocyanate as a curing agent, and the viscosity of the mixture was adjusted with a thickner ("SN Thickner A-803," produced by San Nopco, Ltd.) so that the viscosity at 25° C. became 4,000 to 5,000 mPa·s to obtain an aqueous adhesive (X-1). The aqueous adhesive (X'-1) was evaluated for adhesive strength and water resistance according to the test methods described below. The results are shown in Table 9.

Comparative Evaluation Example 2

Except that the aqueous polyurethane resin dispersion (Q-19) was used instead of the aqueous polyurethane resin dispersion (Q-4), a comparative water-based adhesive (X'-1) was obtained in the same manner as in Evaluation Example 2.

The water-based adhesive (X'-1) was evaluated for adhesive strength and water resistance according to the test methods described below. The results are shown in Table 9.

<Method for Evaluating Adhesive Strength of Water-Based Adhesive>

A water-based adhesive was applied on flexible polyurethane slab foam (100 mm length×120 mm width×5 mm thickness; bulk specific gravity, 0.05) in an application amount of 50 g/m². After drying the foam at 80° C. for 2 minutes, thereto was pressure-bonded another flexible polyurethane slab foam (100 mm length×120 mm width×5 mm thickness; bulk specific gravity, 0.05) with no adhesive applied by a load of 4 kg for 10 seconds. Immediately after the pressure-bonding, peel strength was measured by using an autograph (crosshead speed, 500 mm/min.) using a specimen cut in a 25 mm width. When the peel strength per 25 mm width was 200 g or more, the adhesive strength was evaluated as "Good" and, when the peel strength was less than 200 g, the adhesive strength was evaluated as "Bad." The better the film-forming property of the polyurethane dispersion, the better is the adhesive strength.

<Method for Evaluating Water-Resistant Adhesive Strength of Water-Based Adhesive>

A test specimen, prepared in the same manner as in the above-described test method for adhesive strength, was immersed in boiling water for 1 hour and, immediately thereafter, peel strength was measured. When the peel strength per 25 mm width was 100 g or more, the water-resistant adhesive strength was evaluated as "Good." When the peel strength was less than 100 g, the adhesive strength was evaluated as "Bad."

TABLE 9

|  | Evaluation Example 2 | Comparative Evaluation Example 2 |
| --- | --- | --- |
| Water-based adhesive | X-1 | X'-1 |
| Adhesive strength of water-based adhesive | Good | Bad |
| Water-resistant adhesion of water-based adhesive | Good | Bad |

Evaluation Example 3

Evaluation as a Water-Based Textile Processing and Treating Agent

Using an aqueous polyurethane resin dispersion, a pigment printing paste was prepared as follows.

To 100 parts of the aqueous polyurethane resin dispersion (Q-2) obtained in Example 2 were added 8.9 parts of a rheology control agent ("SN Thickener 618," produced by San Nopco Ltd.), 0.9 part of a silicon-based anti-foaming agent ("SN Defoamer 777," produced by San Nopco Ltd.), 35 parts of water, 44.6 parts of titanium oxide, and 18.9 parts of a pigment ("NL Red FR3R-D", produced by Yamasou Corporation) to obtain a pigment printing paste (Y-1). The pigment printing paste (Y-1) was tested for water resistance of a pigment printed fiber cloth and for film-forming property of the pigment printing paste according to the test methods described below. The results are shown in Table 10.

Comparative Evaluation Example 3

Except that the aqueous polyurethane resin dispersion (Q-20) was used instead of the aqueous polyurethane resin dispersion (Q-2), a comparative pigment printing paste (Y'-1) was obtained in the same manner as in Evaluation Example 3. The pigment printing paste (Y'-1) was tested for water resistance of a pigment printed fiber cloth and for film-forming property of the pigment printing paste. The results are shown in Table 10.

<Method for Evaluating Water Resistance of Pigment Printed Fiber Cloth>

A pigment printing paste was coated on a piece of flat-woven cotton fabric in a size of 2 cm length×10 cm width×0.2 mm film thickness by using a bar coater. This was dried for 5 minutes in a tenter, temperature of which was adjusted to 140° C., to obtain a pigment printed fiber cloth. After immersion of this pigment printed fiber cloth in ion-exchanged water of 60° C. for one day, this was taken out and wiped lightly on the surface with a non-print-treated fiber cloth. Evaluation was performed visually according to the following evaluation criteria:

Good: there is no color migration to the non-print-treated fiber cloth; and

Bad: color migration to the non-print-treated fiber cloth is observed.

<Method for Evaluating Film-Forming Property of Pigment Printing Paste>

A pigment printing paste was coated on a piece of flat-woven cotton fabric in a size of 2 cm length×10 cm width×0.2 mm film thickness by using a bar coater. This was dried for 3 minutes in a tenter, temperature of which was adjusted to 120° C., to obtain a pigment printed fiber cloth. The surface of this pigment printed fiber cloth was wiped lightly with a non-printed fiber cloth and evaluation was performed visually according to the following evaluation criteria:

Good: there is no color migration to the non-print-treated fiber cloth; and

Bad: color migration to the non-print-treated fiber cloth is observed.

TABLE 10

|  | Evaluation Example 3 | Comparative Evaluation Example 3 |
|---|---|---|
| Pigment printing paste | Y-1 | Y'-1 |
| Water resistance of pigment printed fiber cloth | Good | Bad |
| Film-forming property of pigment printing paste | Good | Bad |

INDUSTRIAL APPLICABILITY

The aqueous polyurethane resin dispersion of the present invention can be suitably used for paint compositions, adhesive compositions, textile processing and treating agent compositions, and the like.

The invention claimed is:

1. An aqueous polyurethane resin dispersion comprising water and a polyurethane resin (U) and satisfying all of the following conditions (1) to (6):
    (1) a urethane group content in the polyurethane resin (U) is 0.5 to 5.0 mmol/g, based on weight of the polyurethane resin (U);
    (2) a terminal amino group content in the polyurethane resin (U) is not more than 0.35 mmol/g, based on the weight of the polyurethane resin (U);
    (3) a number average molecular weight (Mn) of the polyurethane resin (U) is 10,000 to 1,000,000;
    (4) a ratio (Mw/Mn) of a weight average molecular weight (Mw) to the number average molecular weight (Mn) of the polyurethane resin (U) is 1.5 to 3.5;
    (5) a melting temperature of the polyurethane resin (U) is 70 to 280° C.; and
    (6) a volume average particle diameter (Dv) of the polyurethane resin (U) is 0.01 to 1 μm.

2. The aqueous polyurethane resin dispersion according to claim 1, wherein a urea group content in the polyurethane resin (U) is not more than 2.0 mmol/g, based on the weight of the polyurethane resin (U).

3. The aqueous polyurethane resin dispersion according to claim 1, wherein a total of contents of allophanate groups and biuret groups in the polyurethane resin (U) is not more than 0.1 mmol/g, based on the weight of the polyurethane resin (U).

4. The aqueous polyurethane resin dispersion according to claim 1, wherein the polyurethane resin (U) is a polyurethane resin having hydrophilic groups.

5. The aqueous polyurethane resin dispersion according to claim 1, wherein the content of organic solvent is not more than 1,000 ppm.

6. The aqueous polyurethane resin dispersion according to claim 1, which is used for a water-based paint.

7. The aqueous polyurethane resin dispersion according to claim 1, which is used for a water-based adhesive.

8. The aqueous polyurethane resin dispersion according to claim 1, which is used for a water-based textile processing and treating agent.

9. A process for producing the aqueous polyurethane resin dispersion according to claim 1, wherein the polyurethane resin (U) is dispersed in water by using a rotating disperser, an ultrasonic disperser, or a kneader.

10. The process according to claim 9 for producing the aqueous polyurethane resin dispersion, wherein the polyurethane resin (U) has hydrophilic groups.

11. The process according to claim 10 for producing the aqueous polyurethane resin dispersion, wherein the polyurethane resin (U) is a polyurethane resin obtained by subjecting a polyol (a); a polyisocyanate (b); a compound (c) having a hydrophilic group and an active hydrogen atom; and, if necessary, a chain extending agent (d) and a reaction terminating agent (e) to a urethanaization reaction in a uniaxial or biaxial kneader at 100 to 250° C.

12. The process according to claim 11 for producing the aqueous polyurethane resin dispersion, which is carried out in the absence of an organic solvent.

13. The process according to claim 9 for producing the aqueous polyurethane resin dispersion, wherein dispersion is carried out in the presence of a dispersant (h).

14. The process according to claim 9 for producing the aqueous polyurethane resin dispersion, wherein dispersion of the polyurethane resin (U) in water is carried out at a temperature less than a melting temperature of (U).

15. The process according to claim 9 for producing the aqueous polyurethane resin dispersion, wherein dispersion of the polyurethane resin (U) in water is carried out in the absence of an organic solvent.

* * * * *